United States Patent
An et al.

(10) Patent No.: US 9,971,586 B2
(45) Date of Patent: May 15, 2018

(54) SYSTEM AND METHOD FOR PROVIDING SERVICE VIA APPLICATION

(71) Applicant: SAMSUNG ELECTRONICS CO., LTD., Suwon-si (KR)

(72) Inventors: Dong-hyeok An, Daegu (KR); Kil-su Eo, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 90 days.

(21) Appl. No.: 14/857,909

(22) Filed: Sep. 18, 2015

(65) Prior Publication Data

US 2016/0085536 A1  Mar. 24, 2016

(30) Foreign Application Priority Data

Sep. 18, 2014 (KR) .......................... 10-2014-0124631
Jan. 30, 2015 (KR) .......................... 10-2015-0015582

(51) Int. Cl.
*G06F 9/45* (2006.01)
*G06F 9/445* (2018.01)
(Continued)

(52) U.S. Cl.
CPC .............. *G06F 8/61* (2013.01); *G06F 3/0482* (2013.01); *G06F 3/04817* (2013.01);
(Continued)

(58) Field of Classification Search
CPC . G06F 9/4443; G06F 8/65; G06F 8/61; G06F 3/0482; G06F 3/04817;
(Continued)

(56) References Cited

U.S. PATENT DOCUMENTS 6,667,971 B1 * 12/2003 Modarressi ......... H04L 12/2856
                                                                370/352
7,926,030 B1 *  4/2011 Harmon ................ G06F 9/4446
                                                                717/121
(Continued)

FOREIGN PATENT DOCUMENTS

CN  101957844 A  1/2011
CN  102404481 A  4/2012
(Continued)

OTHER PUBLICATIONS

Murali Rangan et al., "Contextual Replication for Mobile Users", [Online], 2005, pp. 1-7, [Retrieved from Internet on Nov. 9, 2017], <http://ieeexplore.ieee.org/stamp/stamp.jsp?arnumber=1493647>.*

(Continued)

*Primary Examiner* — Ziaul A Chowdhury
(74) *Attorney, Agent, or Firm* — Sughrue Mion, PLLC

(57) ABSTRACT

Provided are a system and method for providing a service through an application. A device that receives a service from a service providing server using an application includes a communicator configured to communicate with the service providing server and an application providing server, and a controller configured to control the communicator to request the application providing server to transmit the application and a browser user interface (UI) of the application, receive the browser UI from the application providing server, receive user data which is input in association with the service while the service is provided through the browser UI, receive the application from the application providing server and execute the received application while receiving the service through the browser UI, and retrieve the user data through the application to continuously receive the service.

12 Claims, 21 Drawing Sheets

(51) Int. Cl.
*H04M 1/725* (2006.01)
*H04L 29/08* (2006.01)
*G06F 17/30* (2006.01)
*G06F 3/0481* (2013.01)
*G06F 3/0482* (2013.01)
*G06F 3/0484* (2013.01)
*G06F 9/44* (2018.01)

(52) U.S. Cl.
CPC ............ *G06F 3/04842* (2013.01); *G06F 8/65* (2013.01); *G06F 17/3089* (2013.01); *H04L 67/02* (2013.01); *H04L 67/34* (2013.01); *H04M 1/72525* (2013.01); *G06F 9/4443* (2013.01); *H04M 1/72561* (2013.01)

(58) Field of Classification Search
CPC .......... G06F 3/048242; G06F 17/3089; H04M 15/63; H04M 1/72525; H04M 1/72561; H04L 67/02; H04L 67/34
See application file for complete search history.

(56) References Cited

U.S. PATENT DOCUMENTS

| | | | |
|---|---|---|---|
| 8,781,529 B2* | 7/2014 | Kerdraon | H04M 1/72525 455/434 |
| 9,229,834 B2 | 1/2016 | Li et al. | |
| 9,307,104 B2 | 4/2016 | Goda | |
| 9,426,529 B2 | 8/2016 | Lee | |
| 9,602,851 B2 | 3/2017 | McCoy et al. | |
| 9,727,321 B2* | 8/2017 | Gunderson | G06F 8/61 |
| 9,733,799 B2* | 8/2017 | Petersen | G06F 3/0482 |
| 9,807,224 B2* | 10/2017 | Magnus | H04M 1/72561 |
| 2003/0105888 A1 | 6/2003 | Connelly et al. | |
| 2004/0006586 A1* | 1/2004 | Melchione | G06F 8/61 709/201 |
| 2004/0110497 A1* | 6/2004 | Little | G06F 17/3089 455/418 |
| 2009/0199132 A1 | 8/2009 | Chong et al. | |
| 2009/0270077 A1* | 10/2009 | Fiorini | H04L 67/34 455/414.1 |
| 2010/0138515 A1* | 6/2010 | Ruiz-Velasco | G06F 9/445 709/217 |
| 2010/0332565 A1* | 12/2010 | Al-Shaykh | G06F 17/30905 707/912 |
| 2011/0099283 A1* | 4/2011 | Park | G06F 8/65 709/230 |
| 2011/0119079 A1* | 5/2011 | Schoenberg | G06F 19/328 705/2 |
| 2011/0228763 A1* | 9/2011 | Magnus | H04M 1/72561 370/352 |
| 2011/0247045 A1* | 10/2011 | Rajagopal | H04L 63/08 726/1 |
| 2013/0019314 A1* | 1/2013 | Ji | H04L 67/02 726/25 |
| 2013/0029719 A1* | 1/2013 | Choi | H04W 4/003 455/525 |
| 2013/0047065 A1 | 2/2013 | Lee | |
| 2013/0059531 A1* | 3/2013 | Kim | H04L 65/1083 455/39 |
| 2013/0132854 A1* | 5/2013 | Raleigh | G06F 3/0482 715/738 |
| 2013/0151598 A1 | 6/2013 | Fu et al. | |
| 2013/0204982 A1* | 8/2013 | Kim | H04L 29/06312 709/219 |
| 2014/0040877 A1 | 2/2014 | Goldman et al. | |
| 2014/0066015 A1* | 3/2014 | Aissi | H04W 12/06 455/411 |
| 2014/0237465 A1 | 8/2014 | Lin | |
| 2014/0320516 A1* | 10/2014 | Son | G06F 3/04817 345/589 |
| 2015/0212674 A1* | 7/2015 | Firstenberg | G06F 3/0484 715/747 |
| 2015/0237464 A1* | 8/2015 | Shumaker | H04L 51/20 709/204 |
| 2015/0296072 A1 | 10/2015 | Zhou et al. | |
| 2016/0103918 A1* | 4/2016 | Alekseyev | G06F 3/04842 715/810 |
| 2017/0177324 A1* | 6/2017 | Frank | H04L 67/34 |

FOREIGN PATENT DOCUMENTS

| | | |
|---|---|---|
| CN | 102685576 A | 9/2012 |
| CN | 103034533 A | 4/2013 |
| CN | 103733635 A | 4/2014 |
| CN | 104049980 A | 9/2014 |
| EP | 2523107 A1 | 11/2012 |
| WO | 2009/032232 A1 | 3/2009 |
| WO | 2014/071755 A1 | 5/2014 |

OTHER PUBLICATIONS

Tapas Kumar Kundu et al. "Anroid on Mobile Device: An Energy Perspective", [Online], 2010, pp. 2421-2426, [Retrieved from Internet on Nov. 9, 2017], <http://ieeexplore.ieee.org/stamp/stamp.jsp?arnumber=5578292>.*

Tao Gu et al., "Toward an OSGi-Based Infrastructure for Context-Aware Applications", [Online], 2004, pp. 66-74, [Retrieved from Internet on Nov. 9, 2017], <http://ieeexplore.ieee.org/stamp/stamp.jsp?arnumber=1369163>.*

Panagiotis Papakos et al., "VOLARE: Context-Aware Adaptive Cloud Service Discovery for Mobile Systems", [Online], 2010, pp. 32-38, [Retrieved from Internet on Nov. 9, 2017], <http://delivery.acm.org/10.1145/1900000/1891706/p32-papakos.pdf>.*

Communication dated Feb. 5, 2016, issued by the European Patent Office in counterpart European Application No. 15185969.1.

Communication dated Jan. 14, 2016, issued by the International Searching Authority in counterpart International Application No. PCT/KR2015/009747 (PCT/ISA/210 & PCT/ISA/237).

Chinese Office Action, dated Feb. 24, 2018, issued in Chinese Patent Application No. 201510599214X.

* cited by examiner

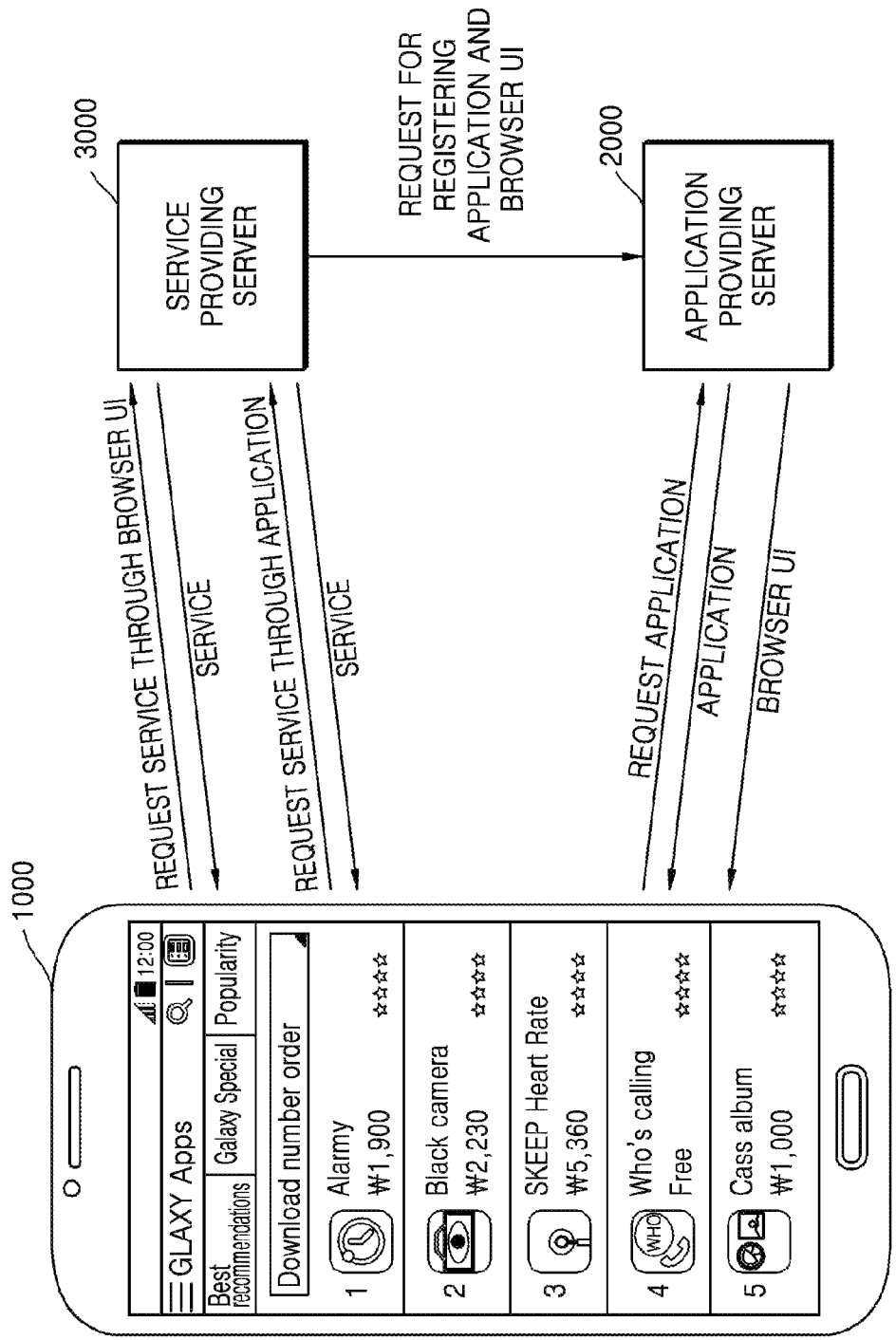

SYSTEM AND METHOD FOR PROVIDING SERVICE VIA APPLICATION

CROSS-REFERENCE TO RELATED APPLICATIONS

This application claims priority from Korean Patent Application No. 10-2014-0124631, filed on Sep. 18, 2014, and Korean Patent Application No. 10-2015-0015582, filed on Jan. 30, 2015 in the Korean Intellectual Property Office, the disclosures of which are incorporated herein in their entireties by reference.

BACKGROUND

1. Field

Apparatuses and methods consistent with exemplary embodiments relate to providing a service to a device that is downloading an application.

2. Description of the Related Art

As network and multimedia technologies have developed, it has become possible to provide users of devices with various services from service providing servers. In addition, each service providing server provides a dedicated application needed to use a service provided by the service providing server. Thus, a device may use such a service more conveniently by receiving and installing an application dedicated to the service providing server.

However, since the device should download and install an application needed to use a service provided by a service providing server to use the service, users have experienced difficulty receiving a desired service immediately.

Accordingly, there is a need for a solution that allows a device to effectively receive a service from a service providing server even while the device is downloading and installing an application needed to use the service.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a system and method for providing a service in which a device may use a service of a service providing server through a browser UI of an application before the application is installed in the device.

Still, one or more exemplary embodiments provide a system and method for providing a service in which a device may download and install an application for using a service of a service providing server while using the service of the service providing server through a browser UI of the application.

Still further, one or more exemplary embodiments provide a system and method for providing a service in which a device may continuously and seamlessly use a service having been received through the browser UI of the application through an application installed on the device.

According to an aspect of an exemplary embodiment, there is provided a device that receives a service from a service providing server using an application, the device including: a communicator configured to communicate with the service providing server and an application providing server; and a controller configured to control the communicator to request the application providing server to transmit the application and a browser user interface (UI) of the application, receive the browser UI from the application providing server, receive user data which is input in association with the service while the service is provided through the browser UI, receive the application from the application providing server and execute the received application while receiving the service through the browser UI, and retrieve the user data through the application to continuously receive the service.

The controller may be further configured to execute a browser installed on the device, display the browser UI on a screen of the device through the executed browser, and receive the service from the service providing server based on the user data received through the displayed browser UI.

The user data may be server log information associated with the service, and the controller is further configured to use the received log information to continuously receive the service through the executed application after a web browser displaying the browser UI is closed.

The controller may be further configured to end display of the browser UI and apply the log information, which has been stored at the end of the display of the browser UI, to a service to be received through the executed application.

The controller may be further configured to determine the time at which the display of the browser UI is to be ended based on a service usage status of the service being received through the browser UI.

The controller may be further configured to synchronize service data received through the browser UI up to the end time with service data to be received through the executed application.

The request for the application may include requesting an installation file of the application or an update file of the application.

The browser UI may be registered on the application providing server by the service providing server in addition to the installation file of the application or the update file of the application.

The browser UI may be automatically converted from a UI of the application by the application providing server.

The controller may be further configured to download the requested application in a background of the device and execute the downloaded application.

The application providing server and the service providing server may be managed by one provider.

According to an aspect of another exemplary embodiment, there is provided method of a device receiving a service from a service providing server using an application including: requesting an application providing server to transmit the application and a browser UI of the application; receiving the browser UI from the application providing server; receiving user data which is input in association with the service while the service is provided through the browser UI; receiving the application from the application providing server and executing the received application while receiving the service through the browser UI; and retrieving the user data through the application to continuously receive the service through the executed application.

The receiving the service through the browser UI may include executing a browser installed on the device, displaying the browser UI on a screen of the device through the executed browser, and receiving the service from the service providing server based on the user data received through the displayed browser UI.

The user data may be server log information associated with the service, and the retrieving the user data may include retrieving the log information received through the browser UI from the service providing server, and using the received log information to continuously receive the service through the executed application after a web browser displaying the browser UI is closed.

The method may further include ending display of the browser UI and applying the log information, which has been stored at the end of the display of the browser UI, to a service to be received through the executed application.

The method may further include determining the time at which the display of the browser UI is to be ended based on a service usage status of the service being received through the browser UI.

The method may further include synchronizing service data received through the browser UI up to the end time with service data to be received through the executed application.

The requesting the application may include requesting an installation file of the application or an update file of the application.

The browser UI may be registered on the application providing server by the service providing server in addition to the installation file of the application or the update file of the application.

According to an aspect of another exemplary embodiment, there is provided a device that receives a service using an application, the device including: a communicator configured to communicate with a server that provides the application and the service provided through the application; and a controller configured to control the communicator to request the server to transmit the application and a browser user interface (UI) of the application, receive the browser UI from the server, receive user data which is input in association with the service while the service is provided through the browser UI, receive the application from the server and execute the received application while receiving the service through the browser UI; and retrieve the user data through the application to continuously receive the service.

According to an aspect of another exemplary embodiment, there is provided a method of an application providing server providing an application for using a service of a service providing server including: registering the application dedicated to the service and a browser UI of the application; receiving a request for the application and the browser UI from the device; and providing the browser UI and the application to the device in response to the request, wherein the application is provided to and installed on the device while the service is provided to the device through the browser UI.

According to an aspect of another exemplary embodiment, there is provided a non-transitory computer-readable storage medium storing a program that is executable by a computer to perform the method.

According to an aspect of another exemplary embodiment, there is provided a method of a terminal device receiving a service from a server through an application dedicated to the service including: accessing a web browser that provides the service; downloading the application from the server; launching the application while the service is being provided through the web browser in response to the terminal device determining that the download of the application has been completed; and retrieving data that is input through the web browser and transmitted to the server in response to the application being launched.

The method may further include displaying a pop-up window on a screen of the terminal device that allows a user to decide whether the service is to be provided through the web browser or the application in response to the terminal device determining that the download of the application has been completed.

The data may be automatically retrieved from the server or a storage of the terminal device in response to the application being launched.

BRIEF DESCRIPTION OF THE DRAWINGS

The above and/or other aspects will be more apparent by describing certain exemplary embodiments, with reference to the accompanying drawings, in which:

FIG. 1A illustrates a schematic diagram of a service providing system that provides a service of a service providing server 3000 to a device 1000 according to an exemplary embodiment;

DETAILED DESCRIPTION

Figure 1B:
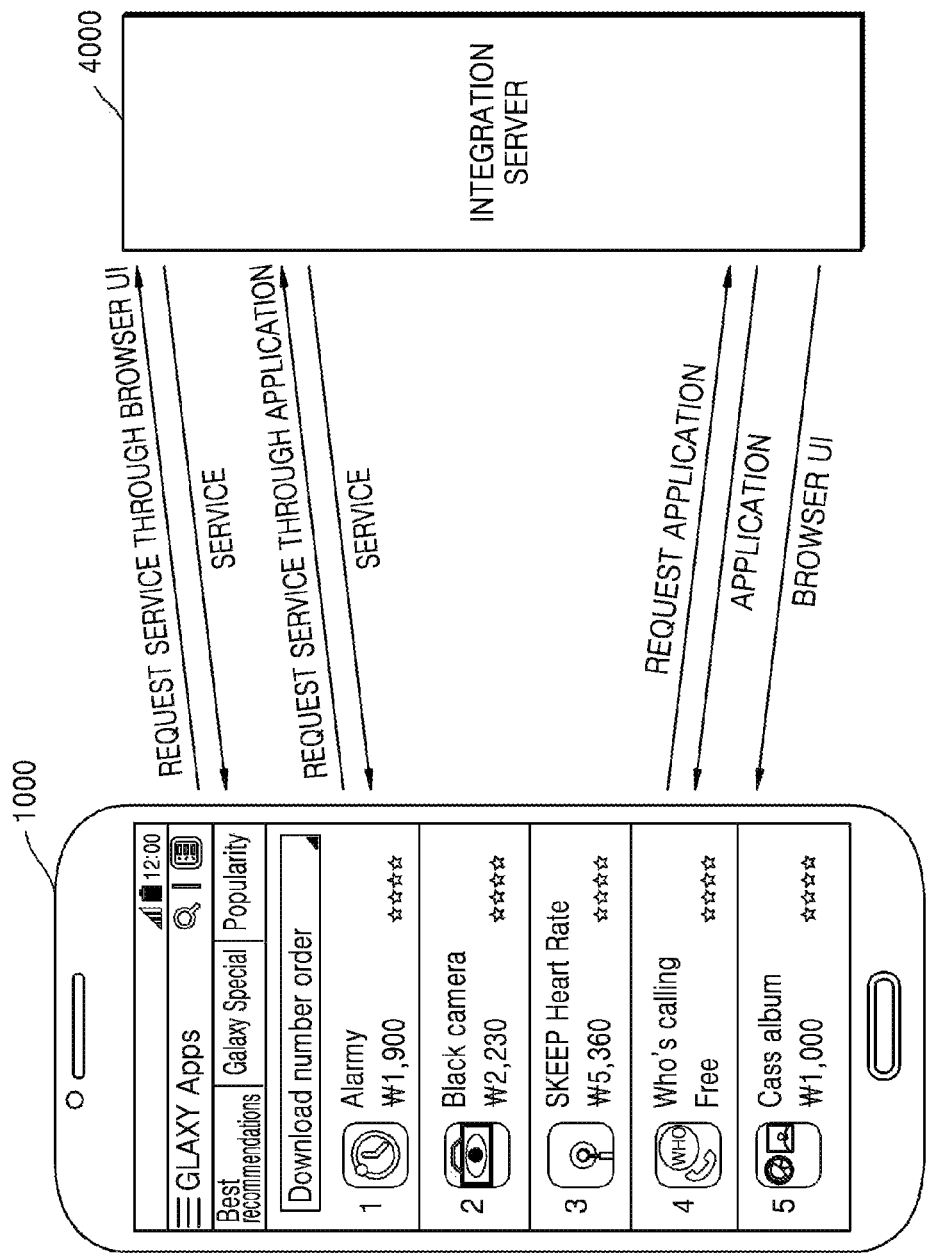
FIG. 1B illustrates a schematic diagram of a service providing system that provides a service to a device 1000 through an integration server 4000 including an application providing server 2000 and a service providing server 3000 according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

In this disclosure below, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when one part is referred to as "comprising (or including or having)" other elements, it should be understood that it can comprise (or include or have) only those elements, or other elements as well as those elements if there is no specific limitation.

In this disclosure, a service includes any kind of service provided to a device by a service providing server. Examples of the service may include a broadcasting service, a content sharing service, a content providing service, a power management service, a game providing service, a chatting service, a document writing service, a search service, a call service, a photograph capturing service, a transport recommendation service, and a video playback service. However, exemplary embodiments of the present invention are not limited thereto.

In addition, log information regarding a service may be information that indicates a service usage history of a user who uses the service. The log information regarding the service may include event information that is generated by the execution of the application needed to use the service.

In addition, a browser user interface (UI) is a UI for receiving a service from a service providing server and may be displayed and used on a screen of a device based on a browser installed on the device. In addition, a user may use a web-based service that is provided from a service providing server through the browser UI displayed on the screen of the device.

In addition, a service providing server may be a server that provides an application needed to use a service of the service providing server to a device. For example, the application providing server may be a server that operates an application market. Furthermore, the application market may include, but is not limited to Galaxy Apps, Google Play, and App Store.

Hereinafter, exemplary embodiments will be described in detail with reference to the accompanying drawings.

FIG. 1A illustrates a schematic diagram of a service providing system including a service providing server 3000 and a device 1000 according to an exemplary embodiment.

Referring to FIG. 1A, the service providing system may include a device 1000, an application providing server 2000, and a service providing server 3000.

The device 1000 may access the application providing server 2000 to receive an application that allows the device 100 to use a service provided by the service providing server 3000. Also, the device 100 may receive from the application providing server 200 a browser user interface (UI) to be displayed on a screen of the device 1000. In addition, while receiving an application from the application providing server 2000, the device 1000 may execute a browser installed on the device 1000 and display the browser UI and may use the displayed browser UI to receive the service of the service providing server 3000 from the service providing server 3000. Receiving the service may denote receiving service data for using the service of the service providing server 3000.

In addition, when reception of an application from the application providing server 2000 is completed, the device 1000 may install the received application on the device 1000 and execute the installed application. Subsequently, the device 1000 may continuously use a service that is being used through the browser UI through the executed application. In this case, the device 1000 may seamlessly use the service of the service providing server 3000 by using service log information received from the service providing server 3000 or service log information stored in the device to synchronize service data of a service being used through the browser UI with service data of a service to be continuously used through the application.

The service providing server 3000 may register, on the application providing server 2000, the application that allows the device 100 to receive the service from the service providing server 3000 and the browser UI to be displayed on the screen of the device 1000 through the browser installed on the device 1000.

To this end, the application providing server 2000 may provide an application registration UI to the service providing server 3000, and the service providing server 3000 may register an application of the service providing server 3000 on the application providing server 2000 through the application registration UI. In addition, the application providing server 2000 may automatically create the browser UI by analyzing a UI of the registered application.

The device may include, but is not limited to, a smartphone, a tablet PC, a personal computer, a smart TV, a cell phone, a personal digital assistant (PDA), a laptop, a media player, a micro server, a Global Positioning System (GPS) device, an e-book terminal, a digital broadcasting terminal, a navigation device, a kiosk, an MP3 player, a digital camera, and another mobile or non-mobile computing device. In addition, the device 1000 may be a wearable device, such as a wrist watch, eyeglasses, a hair band, and a ring, which includes a communication function and a data processing function. However, the exemplary embodiment is not limited thereto, and the device 1000 may be any type of device that may receive an application from the application providing server 2000 and install the received application and may use the service of the service providing server 3000.

As shown in FIG. 1B, the application providing server 2000 and the service providing server 3000 may be integrated into and managed as one integration server 4000. In addition, the application providing server 2000 and the service providing server 3000 may be managed by one provider.

FIG. 1B is a schematic diagram of a service providing system that provides a service to a device 1000 through an integration server 4000 including an application providing server 2000 and a service providing server 3000 according to an exemplary embodiment.

Referring to FIG. 1B, while receiving an application from the integration server 4000, the device 1000 may execute a browser installed on the device 1000 and receive a service from the integration server 4000. Receiving the service may denote receiving service data for using the service of the integration server 4000. In addition, the service provided by the integration server 4000 may be substantially the same as the service provided by the service providing server 3000, but the exemplary embodiment is not limited thereto.

Figure 2:
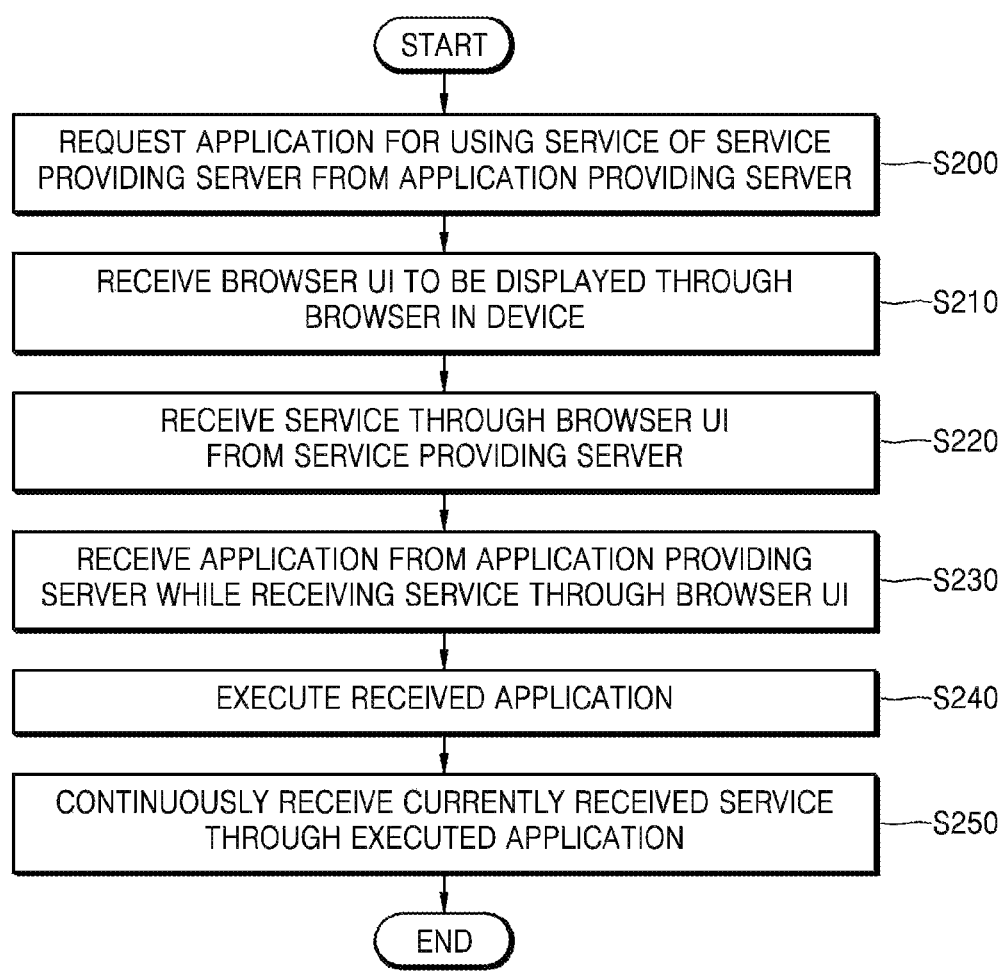
FIG. 2 illustrates a flowchart of a method of a device 1000 using a service of a service providing server 3000 according to an exemplary embodiment.

FIG. 2 illustrates a flowchart of a method of a device 1000 using a service provided by a service providing server 3000 according to an exemplary embodiment.

In operation S200, the device 1000 may request an application for using the service of the service providing server 3000 from the application providing server 2000. The device 1000 may access an application market of the application providing server 2000 and request the application of the service providing server 3000 from the application providing server 2000. The device 1000 may request a file for installing or updating the application from the application providing server 2000. The application market may include, but is not limited to, Galaxy Apps, Google Play, and App Store.

In operation S210, the device 1000 may receive, from the application providing server 2000, a browser UI that may be displayed through a browser installed on the device 1000. The browser UI is a UI for using the service of the service providing server 3000 and may be a UI that may be displayed through the browser installed on the device 1000. The browser UI may be a UI that is converted from a UI of an application for receiving the service of the service providing server 3000. For example, the browser may include, but is not limited to, a Hypertext Markup Language 5 (HTML5)-based browser, a Cascading Style Sheets 3 (CSS3)-based browser, and a JavaScript-based browser.

In this case, in response to the application providing request received from the device 1000 in operation S200, the application providing server 2000 may provide the browser UI of the service providing server 3000 to the device 1000 while providing an installation file or an update file of the application to the device 1000. In addition, the browser UI may be registered on the application providing server 2000 by the service providing server 3000 in advance.

In operation S220, the device 1000 may use the browser UI to receive the service from the service providing server 3000. The device 1000 may execute a preset browser and display the browser UI on the screen of the device 1000 through the executed browser. Furthermore, the device 1000 may receive a service from the service providing server 3000 in response to a user input received through the browser UI.

In operation S230, the device 1000 may receive the application from the application providing server 2000 while receiving the service of the service providing server 3000 through the browser UI. In response to the application providing request received from the device 1000 in operation S200, the application providing server 2000 may transmit the installation file or update file of the application and the browser UI of the service providing server 3000 together.

In operation S240, the device 1000 may execute the received application. The device 1000 may install the application received from the application providing server 2000 in the device 1000 and execute the installed application while using the browser UI to receive the service of the service providing server 3000.

In operation S250, the device 1000 may use the executed application to continuously receive a service being received through the browser UI. The device 1000 may stop receiving the service through the browser UI and continuously execute the stopped service through the executed application. The device 1000 may receive log information regarding the service being received through the browser UI from the service providing server 3000 or may extract log information regarding the service stored in the device 1000. The device 1000 may use the log information to synchronize service data being used through the browser UI with service data to be used through the application. For example, the device 1000 may synchronize the service log information received from the service providing server 3000 with service log information regarding an application installed on the device 1000 by allowing the application installed on the device 1000 to use the service log information received from the service providing server 3000. Alternatively, the device 1000 may synchronize the service log information stored on the device 1000 with the service log information of the application installed on the device 1000 by allowing the application installed on the device 1000 to use the service log information stored on the device 1000. However, the exemplary embodiment is not limited thereto.

In FIG. 2, the application providing server 2000 and the service providing server 3000 are described as separate servers, but the exemplary embodiment is not limited thereto. The application providing server 2000 and the service providing server 3000 may be managed as one integration server 4000. In this case, the integration server 4000 may perform some or all operations of the application providing server 2000 and the service providing server 3000 shown in FIG. 2.

Figure 3:
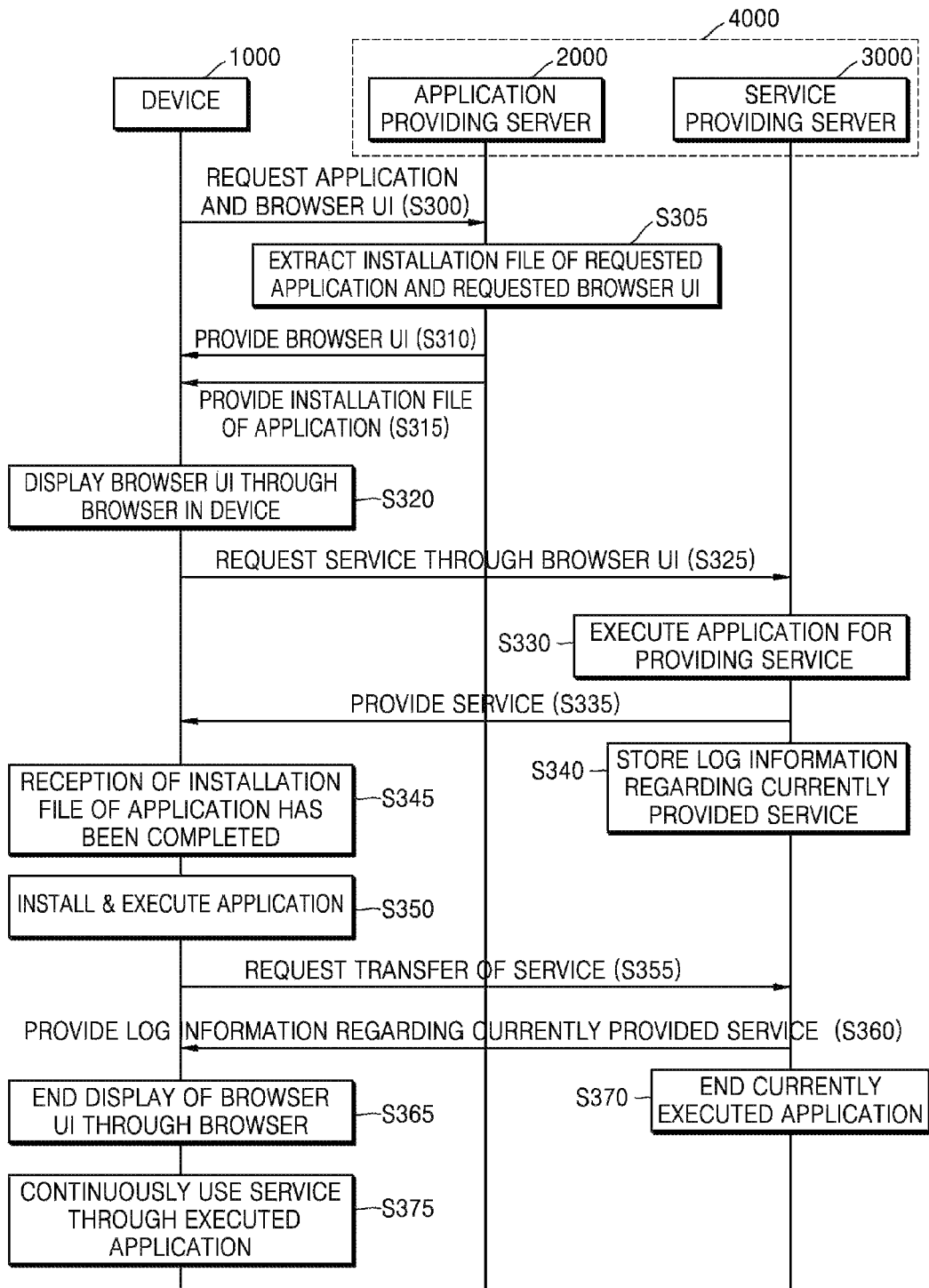
FIG. 3 illustrates a flowchart of a method of using log information stored in the service providing server 3000 to provide a service of a service providing server 3000 to a device 1000 according to an exemplary embodiment.

FIG. 3 illustrates a flowchart of a method of providing a service of a service providing server 3000 to a device 1000 using log information stored in a service providing server 3000 according to an exemplary embodiment.

In operation S300, the device 1000 may request an application and a browser UI from the application providing server 2000. The device 1000 may access an application market of the application providing server 2000 and request the application and the browser UI of the service providing server 3000 from the application providing server 2000. The application market may include, but is not limited to Galaxy Apps, Google Play, and App Store. The device 1000 may request a file for installing or updating the application from the application providing server 2000. Furthermore, the device 1000 may determine whether to request the browser UI from the application providing server 2000 on the basis of the user input.

In operation S305, the application providing server 2000 may extract an installation file of the requested application and the browser UI. In response to the request from the device 1000, the application providing server 2000 may extract an installation file of the application and the browser UI that are registered in a database (DB) of the application providing server 2000. The application providing server 2000 may identify the type of a browser installed on the device 1000 and extract a browser UI compatible with the browser installed on the device 1000. In this case, for each type of browser, the browser UI may be registered on the application providing server 2000 in advance. In addition, the browser UI may be automatically created by the application providing server 2000 by analyzing a UI of an application for using the service of the service providing server 3000.

In addition, the browser UI may be created and stored in the application providing server 2000 in advance, but the exemplary embodiment is not limited thereto. The application providing server 2000 may create the browser UI after receiving the request from the device 1000.

In operation S310, the application providing server 2000 may provide the browser UI to the device 1000. In operation S315, the application providing server 2000 may provide the installation file of the application to the device 1000. The application providing server 2000 may provide the browser UI and the installation file of the application to the device 1000 together. The downloads of the browser UI and the installation file may be completed at different times even when the application providing server 2000 transmits the browser UI and the installation file at the substantially same time. For example, the download of the browser UI may be completed before operation S320 and the download of the installation file may be completed at operation S345 because of the size difference between the two files.

In operation S320, the device 1000 may display the browser UI through the browser installed on the device 1000. The device 1000 may execute the browser while requesting the browser UI from the application providing server 2000. The device 1000 may display the browser UI received from the application providing server 2000 on a screen of the device 1000 through the executed browser.

In operation S325, the device 1000 may request a service from the service providing server 3000 through the browser UI. The device 1000 may receive a user input through the browser UI displayed on the screen of the device 1000 and may request a service from the service providing server 3000.

In operation S330, the service providing server 3000 may execute a service providing application. In response to a service providing request from the device 1000, the service providing server 3000 may execute an application corresponding to the browser UI displayed on the device 1000. In this case, the application may be stored in the service providing server 3000 in advance. The service providing server 3000 has been described as executing the service providing application in S330, but the exemplary embodiment is not limited thereto. The service providing server 3000 may execute various types of software programs for providing the service.

In operation S335, the service providing server 3000 may provide the service to the device 1000. The service providing server 3000 may provide the service to the device 1000 through the application executed on the service providing server 3000.

For example, when the service providing server 3000 provides a game service, a user of the device 1000 may manipulate a game through the browser UI and use a web-based game service provided from the service providing server 3000. The device 1000 may provide a user input received through the browser UI to the service providing server 3000, execute an application for the game service according to the provided user input, and provide a result of the execution of the application to the device 1000.

In operation S340, the service providing server 3000 may store log information regarding the currently provided service. The log information regarding the service may be information indicating a service usage history of a user who uses the service. The log information regarding the service may include event information that is generated by the execution of the application for using the service. For example, assuming that the service is a game service, the log information may include information regarding a current state of a game character, a progress status of a game, etc. Alternatively, for example, assuming that the service is a chatting service, the log information may include information regarding a conversation between users, content transmitted or received between users, etc. Alternatively, for example, assuming that the service is a search service, the log information may include information regarding a search history of a user.

In operation S345, the device 1000 may complete the reception of the installation file of the application. While the service is being provided by the service providing server 3000 through the browser UI, the device 1000 may receive the installation file of the application in the background and complete the reception of the installation file of the application. While using the service provided by the service providing server 3000 through the browser UI, the device 1000 may control the reception of the installation file of the application such that the reception does not interrupt the use of the service of the service providing server 3000 according to a resource occupancy rate of the device 1000. The resource occupancy rate may be determined by at least one of a CPU occupancy rate, a memory occupancy rate, and a network occupancy rate, which are needed to use the service of the service providing server 3000.

In operation S350, the device 1000 may install and execute the application. While using the service provided by the service providing server 3000 through the browser UI, the device 1000 may install and execute the installation file of the application such that the installation and execution do not interrupt the user of the service of the service providing server 3000 according to a resource usage status of the device 1000.

As the installation of the application is completed, the device 1000 may register an installation completion event of an application in middleware of the device 1000, and the middleware may change an agent that uses the service to the device 1000 and execute the installed application.

In operation S355, the device 1000 may request the service providing server 3000 to transfer the service. The device 1000 may request the service providing server 3000 to transfer the service that has been received through the browser UI in order to continuously receive the service through the application installed on the device 1000. In addition, the device 1000 may determine a time at which the transfer of the service is to be requested such that the service may be seamlessly transferred according to a service usage status of the device 1000. For example, assuming that the device 1000 uses a game service, the device 1000 may request the service providing server 3000 to transfer the game service when a certain stage of the game is over.

In operation S360, the service providing server 3000 may provide log information regarding the currently provided service to the device 1000. The service providing server 3000 may provide log information up to the time at which the service transfer request is received to the device 1000.

In operation S365, the device 1000 may display the browser UI through the browser installed on the device 1000. When the device 1000 receives the log information from the service providing server 3000, the device 1000 may end the execution of the browser that uses the browser UI.

In operation S370, the service providing server 3000 may end the application being executed on the service providing server 3000. The service providing server 3000 may end some or all functions of the application being executed on the service providing server 3000. For example, the service providing server 3000 may end a function that is performed through the application executed on the device 1000 among the functions of the application being executed on the service providing server 3000.

In operation S375, the device 1000 may continuously use the service through the application executed on the device 1000. The device 1000 may use the log information received from the service providing server 3000 to continuously use the service, which has been received through the browser UI, through the application executed on the device 1000. For example, assuming that the service of the service providing server 3000 is a game service, the device 1000 may use the log information received from the service providing server 3000 to identify a stage at which the game service used through the browser UI is stopped and a state of a game character. In addition, the device 1000 may continuously receive the game service by applying the identified state of the game character to the identified stage. Furthermore, accordingly, an agent that executes the application for the service of the service providing server 3000 may be changed from the service providing server 3000 to the device 1000. The device 1000 may end the display of the browser UI and may apply log information up to the end time of the display to a service to be received through the application executed on the device 1000.

In FIG. 3, the application providing server 2000 and the service providing server 3000 are described as separate servers, but the present embodiment is not limited thereto. The application providing server 2000 and the service providing server 3000 may be managed as one integration server 4000. In this case, the integration server 4000 may perform some or all operations of the application providing server 2000 and the service providing server 3000 shown in FIG. 3.

Figure 4:
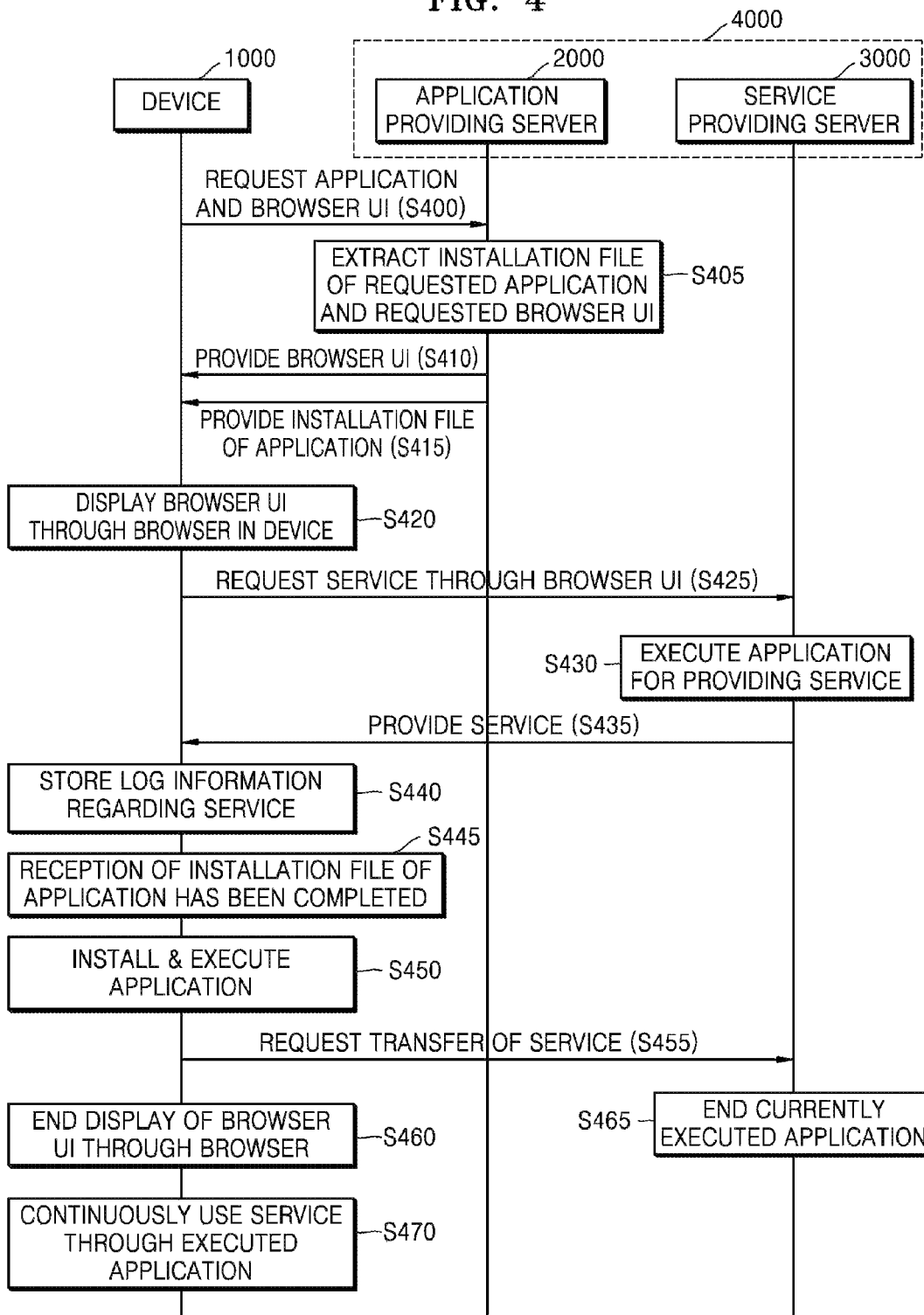
FIG. 4 illustrates a flowchart of a method of using log information stored in the device 1000 to provide a service of a service providing server 3000 to a device 1000 according to an exemplary embodiment.

FIG. 4 illustrates a flowchart of a method of providing a service of a service providing server 3000 to a device 1000 using log information stored in the device 1000 according to an exemplary embodiment.

Operations S400 to S435 of FIG. 4 may correspond to operations S300 to S335 of FIG. 3, and thus descriptions thereof will be omitted.

In operation S440, the device 1000 may store the log information regarding the currently received service. The device 1000 may receive and store the log information regarding the service from the service providing server 3000 in real time or periodically. For example, assuming that the service is a game service, the log information may include information regarding a current state of a game character, a progress status of a game, etc. Alternatively, for example, assuming that the service is a chatting service, the log information may include information regarding a conversation between users, content transmitted or received between users, etc. Alternatively, for example, assuming that the service is a search service, the log information may include information regarding a search history of a user.

In operation S445, while receiving the service through the browser UI, the device 1000 may complete the reception of the installation file of the application. In operation S450, while receiving the service through the browser UI, the device 1000 may install and execute the application.

In operation S455, the device 1000 may request the service providing server 3000 to transfer the service. In operation S460, the device 1000 may end the display of the browser UI through the browser. In operation S465, the service providing server 3000 may end the application being executed on the service providing server 3000. The service providing server 3000 may end some or all functions of the application being executed on the service providing server 3000. For example, the service providing server 3000 may end a function that is performed through the application executed on the device 1000 among the functions of the application being executed on the service providing server 3000.

Alternatively, operation S455 may be omitted. When the browser UI is closed, the service providing server 3000 may detect or recognize the browser close event and then may perform operation S465.

In operation S470, the device 1000 may continuously use the service through the application executed on the device 1000. The device 1000 may use the log information stored in the device 1000 to continuously use the service, which has been received through the browser UI, through the application executed on the device 1000.

In FIG. 4, the application providing server 2000 and the service providing server 3000 are described as separate servers, but the present embodiment is not limited thereto. The application providing server 2000 and the service providing server 3000 may be managed as one integration server 4000. In this case, the integration server 4000 may perform some or all operations of the application providing server 2000 and the service providing server 3000 shown in FIG. 4.

In FIGS. 3 and 4, the device 1000 requests the application providing server 2000 to transmit a browser UI in operations S300 and S400, and in turn receives the requested browser UI from the application providing server 2000 in operations S310 and S410. However, operations S300, S310, S400, and S410 may be omitted. In that case, the device 1000 may access a web browser of the service providing server 3000 using an internet protocol (IP) address given to the service providing server 3000, and receive the service through the web browser without separately downloading the browser UI. The web browser may have substantially the same look and appearance as the browser UI. The device 1000 may automatically launch the application while receiving the service through the web browser if the device 1000 detects or determines that the download and the installation of the application have been completed through operations S345, S350, S445, and S450. The device 1000 may generate a pop-up window before launching the application to allow the user of the device 1000 to determine whether the service is to be provided through the web browser or the application. When the application is determined to be executed, the device 1000 may retrieve data that is input through the web browser. The data may be retrieved from the service providing server 3000 as shown in FIG. 3 or from the device 1000 itself as shown in FIG. 4. When the data is retrieved from the service providing server 3000, the service providing server 3000 may determine, based on a phone number or a user ID of the device 1000, whether the device 1000 that downloaded and installed the application and the device 1000 that accessed the web browser are the same device or managed by the same user. Specifically, when the device 1000 accesses the web browser, the service providing server 3000 may request the device 1000 to enter a phone number or a user ID and a password so that the service providing server 3000 is able to provide the data only to the authenticated device 1000. Accordingly, the service may be seamlessly delivered to the device 1000 when the method of providing the service is switched from the web browser to the application.

Figure 5:
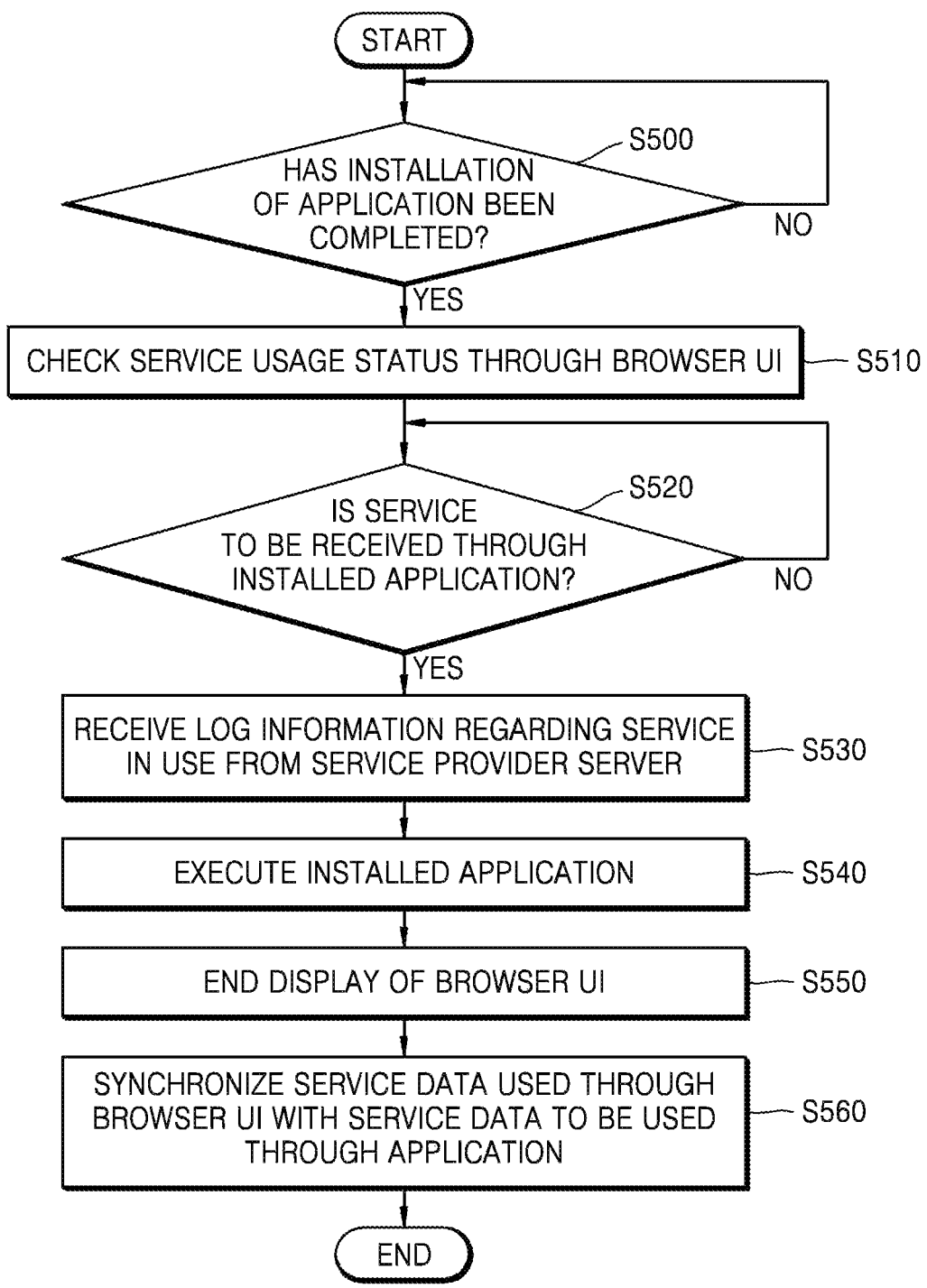
FIG. 5 illustrates a flowchart of a method of a device 1000 changing an agent that executes an application for a service of a service providing server 3000 according to an exemplary embodiment.

FIG. 5 illustrates a flowchart of a method of a device 1000 changing an agent that executes an application for a service of a service providing server 3000 according to an exemplary embodiment.

In operation S500, the device 1000 may determine whether the installation of the application has been completed. The device 1000 may download the installation file of the application from the application providing server 2000 in the background of the device 1000 and then install the downloaded installation file while receiving the service from the service providing server 3000 through the browser UI. In addition, the device 1000 may control the download and installation of the application according to a resource occupancy rate of the device 1000.

When it is determined in operation S500 that the installation of the application has been completed, the device 1000 may check a usage status of the service received through the browser UI in operation S510. For example, assuming that the service is a game service, the device 1000 may check a progress status of the game. Alternatively, for example, assuming that the service is a chatting service, the device 1000 may check whether messages or content is being transmitted or received between users. Alternatively, for example, assuming that the service is a search service, the device 1000 may check whether a user input for search is being received or the search is in progress.

In operation S520, the device 1000 may determine whether to receive the service of the service providing server 3000 through the application installed on the device 1000. The device 1000 may determine whether to receive the service that has been received through the browser UI through the application installed on the device 1000 by determining whether the service usage status is a predetermined status. For example, assuming the service is a game service, the device 1000 may determine to receive the game service through the application installed on the device 1000 when it is determined that a certain stage of the game is over. Alternatively, for example, assuming the service is a chatting service, the device 1000 may determine to receive the chatting service through the application installed on the device 1000 when it is determined that transmission or reception of messages or content between users has been completed. Alternatively, for example, assuming the service is a search service, the device 1000 may determine to receive the search service through the application installed on the device 1000 when it is determined that an input of a keyword for search by a user has been completed or the search based on the keyword has been completed. In addition, for example, the device 1000 may determine to receive the service that has been received through the browser UI through the application installed on the device 1000 when a page of the browser UI displayed on the screen is switched to another page.

In operation S530, the device 1000 may receive log information regarding the service in use from the service providing server 3000. In addition, the device 1000 may store the log information regarding the service in use in the device 1000. For example, assuming the service is a game service, the log information may include information regarding a current state of a game character, a progress status of a game, etc. Alternatively, for example, assuming that the service is a chatting service, the log information may include information regarding a conversation between users, content transmitted or received between users, etc. Alternatively, for example, assuming that the service is a search service, the log information may include information regarding a search history of a user.

In operation S540, the device 1000 may execute the installed application. In operation S550, the device 1000 may end the display of the browser UI. The device 1000 may end the display of the browser UI by ending the execution of the browser that displays the browser UI.

In operation S560, the device 1000 may synchronize service data used through the browser UI with service date to be used through the application. The device 1000 may use the log information regarding the service to synchronize service data at the time at which the display of the browser UI is ended with service data to be used through the application. The device 1000 may end the display of the browser UI and may apply log information up to the end time of the display to a service to be received through the application executed on the device 1000. Accordingly, a user may continuously use the service used through the browser UI through the application installed on the device 1000.

In FIG. 5, the application providing server 2000 and the service providing server 3000 are described as separate servers, but are not limited thereto. The application providing server 2000 and the service providing server 3000 may be managed as one integration server 4000. In this case, the device 1000 may perform some or all operations in FIG. 5 by communicating with the integration server 4000.

Figure 6A:
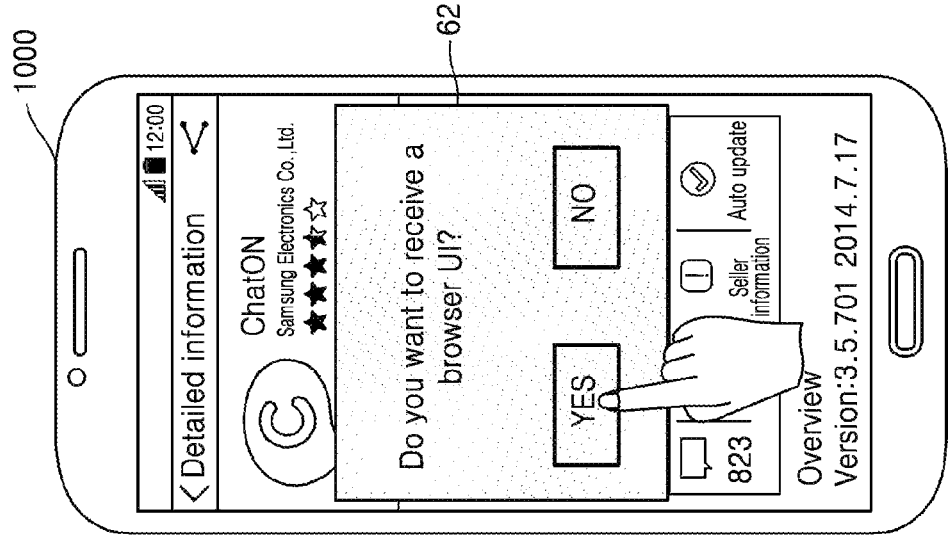
FIGS. 6A and 6B illustrate a diagram of an example in which a device 1000 receives a browser user interface (UI) from an application providing server 2000 according to an exemplary embodiment.
Figure 6B:
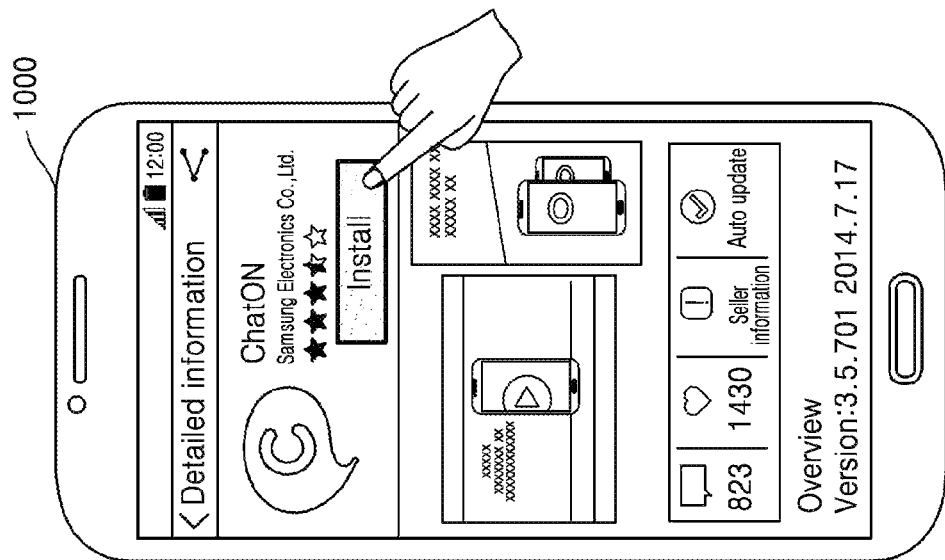

FIGS. 6A and 6B illustrate a diagram of an example in which a device 1000 receives a browser UI from an application providing server 2000 or integration server 4000 according to an exemplary embodiment.

Referring to FIG. 6A, the device 1000 may access an application market served by the application providing server 2000 or the integration server 4000. The device 1000 may search the application market for the ChatON application, which is a chatting application, and select a button 60 to install the ChatON application on the device 1000.

In addition, referring to FIG. 6B, when the button 60 is selected, a menu window 62 for selecting whether to receive a browser UI of the ChatON application may be displayed on the screen of the device 1000. In this case, the application providing server 2000 or the integration server 4000 may determine whether the browser UI of the ChatON application is registered on the application providing server 2000 or the integration server 4000. When the browser UI is registered on the application providing server 2000 or the integration server 4000, the application providing server 2000 or the integration server 4000 may allow the menu window 62 to be displayed on the screen of the device 1000. In addition, a user of the device 1000 may select a button "YES" in the menu window 62 in order to receive the browser UI of the ChatON application. When the button "YES" is selected in the device 1000, the application providing server 2000 or the integration server 4000 may provide the device 1000 with a browser UI compatible with the browser installed on the device 1000.

In addition, the application providing server 2000 or the integration server 4000 may provide an installation file of the ChatON application, and the device 1000 may download the ChatON application in the background.

Figure 7:
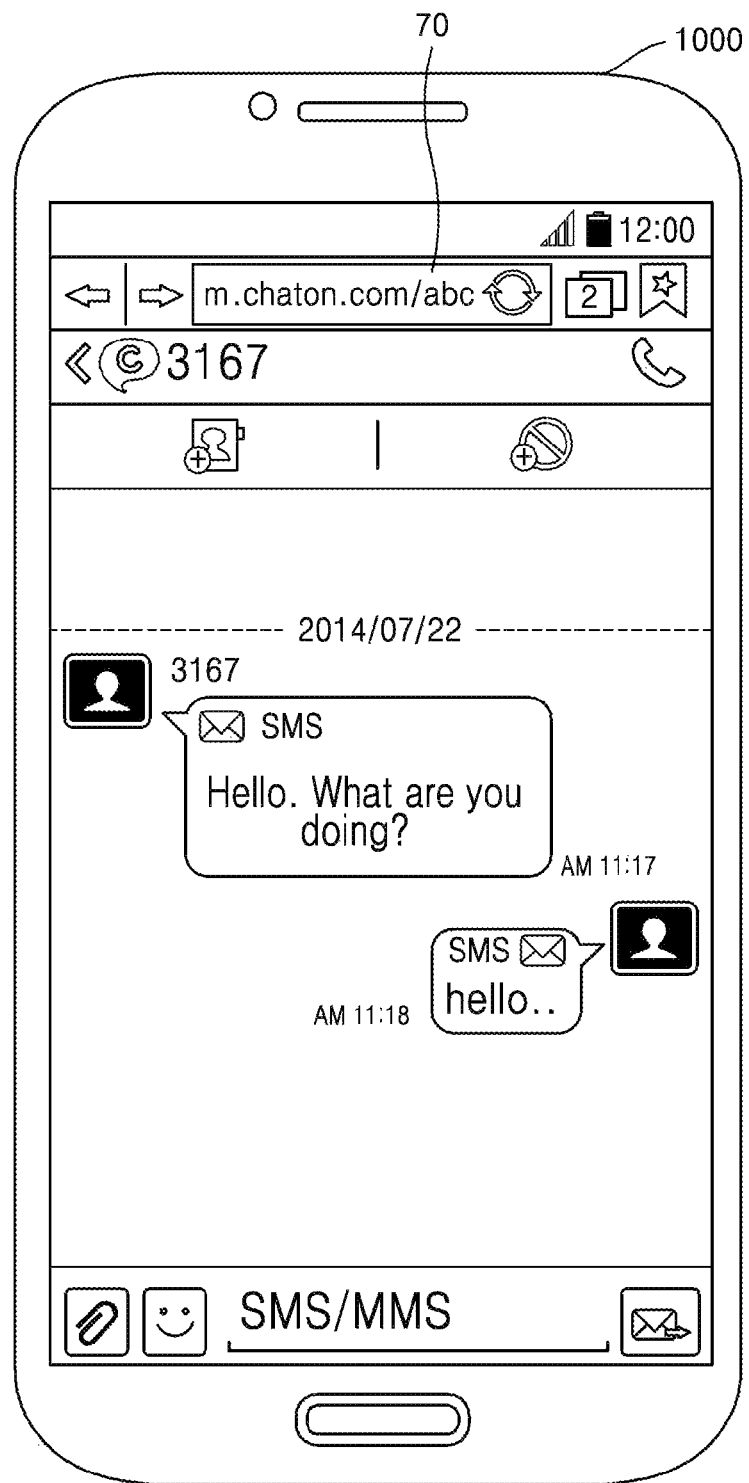
FIG. 7 illustrates a diagram of an example in which a device 1000 displays a browser UI on a screen according to an exemplary embodiment.

FIG. 7 illustrates a diagram of an example in which a device 1000 displays a browser UI on a screen according to an exemplary embodiment.

Referring to FIG. 7, when the button "YES" is selected in FIG. 6B, the device 1000 may execute a web browser in the device 1000, and the device 1000 may receive the browser UI of the ChatON application. The device 1000 may input an address for receiving the browser UI of the ChatON application into an input window of the web browser and receive the browser UI of the ChatON application from the application providing server 2000 or the integration server 4000. In addition, the device 1000 may display the browser UI of the ChatON application on the screen of the device 1000 through the executed web browser.

Subsequently, a user may perform chatting with another user through the browser UI displayed on the screen of the device 1000. The browser UI of the ChatON application may be the same as or different from the UI of the ChatON application.

Figure 8:
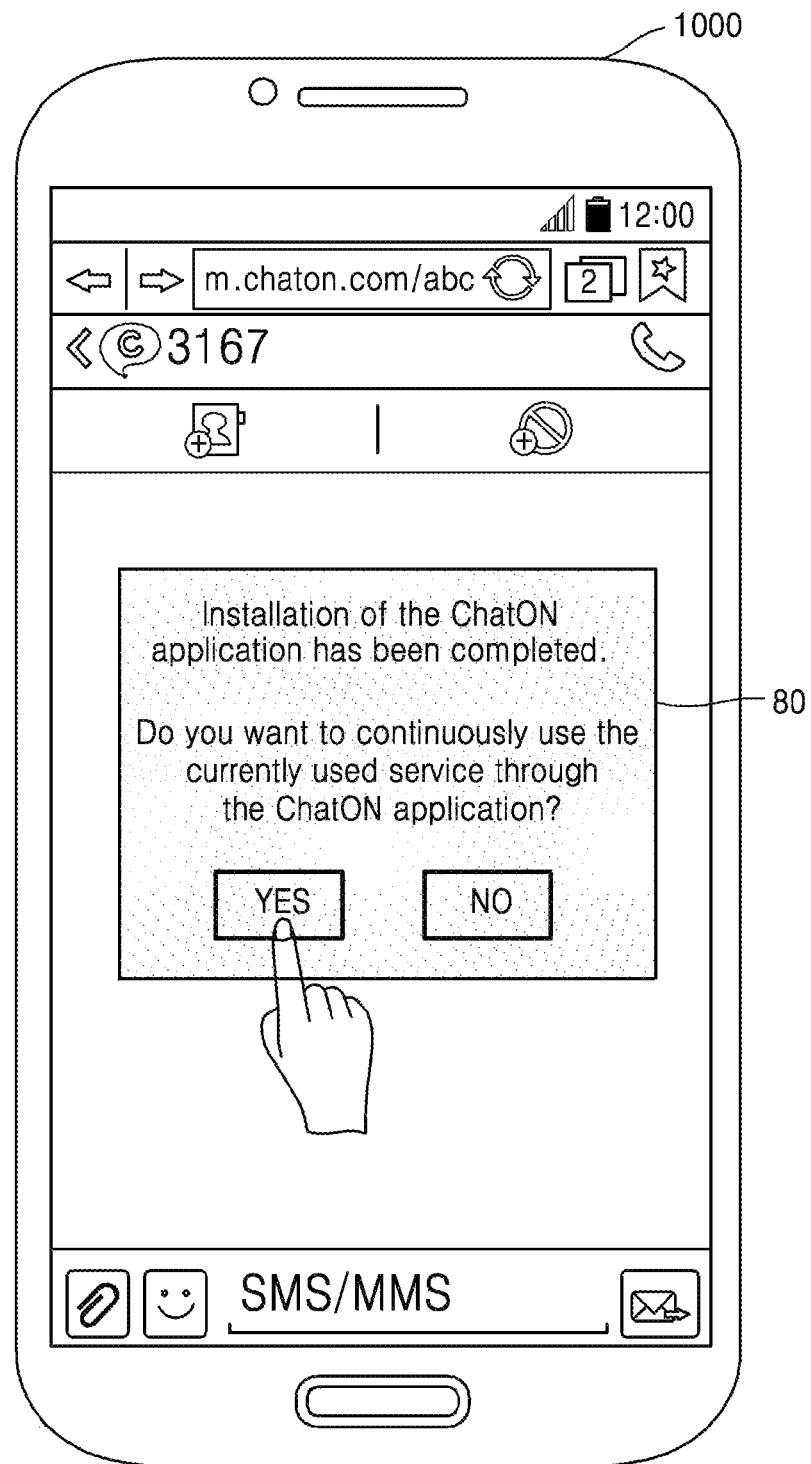
FIG. 8 illustrates a diagram of an example in which it is notified that installation of the ChatON application has been completed while the device 1000 uses a chatting service through a browser UI according to an exemplary embodiment.

FIG. 8 illustrates a diagram of an example in which it is notified that installation of the ChatON application has been completed while the device 1000 uses a chatting service through a browser UI according to an exemplary embodiment.

Referring to FIG. 8, the device 1000 may download and install the ChatON application in the background while using the chatting service through the browser UI. In addition, when the installation of the ChatON application is completed, the device 1000 may display a window 80 for notifying that the installation of the ChatON application has been completed and selecting whether to continuously use the chatting service through the installed ChatON application on the screen of the device 1000. For example, the text "Installation of the ChatON application has been completed. Do you want to continuously use the service in use through the ChatON application?" may be displayed in the window 80.

In addition, the device 1000 may receive a user input of selecting a button "YES" in the window 80 and execute the ChatON application installed on the device 1000.

Figure 9A:
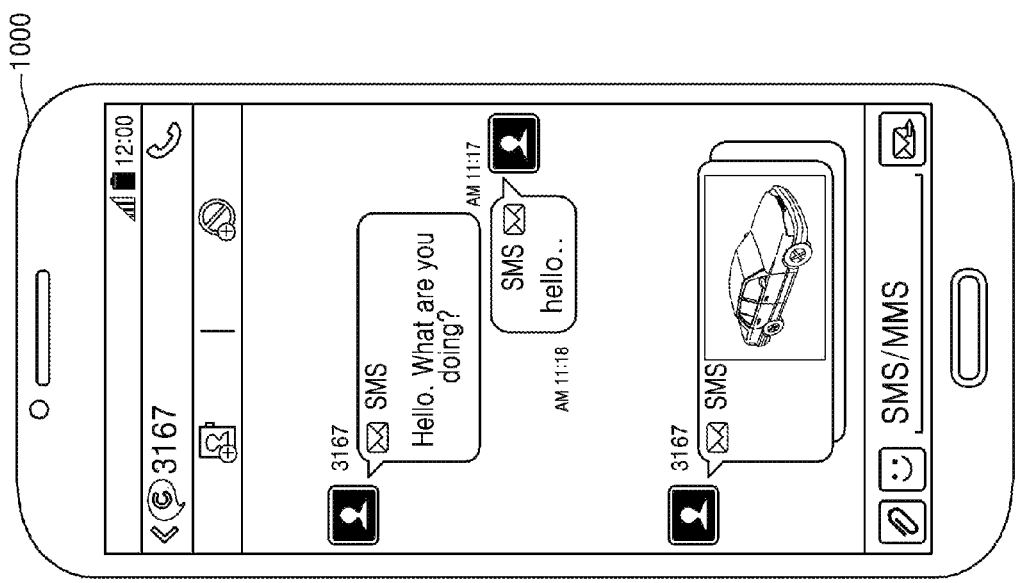
FIGS. 9A and 9B illustrate a diagram of an example in which a device 1000 continuously uses a chatting service that has been used through a browser UI through the ChatON application installed in the device 1000 according to an exemplary embodiment.
Figure 9B:
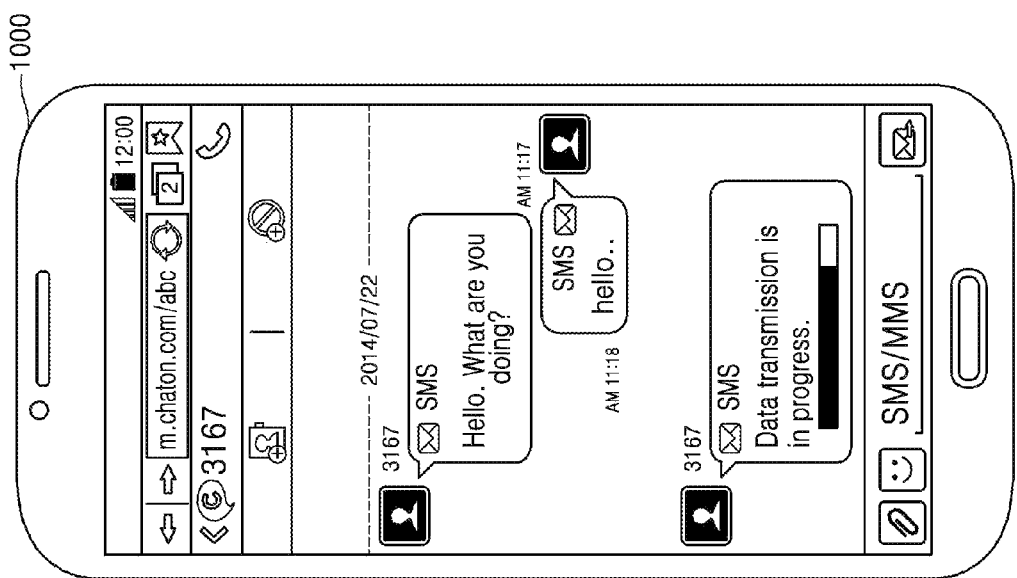

FIGS. 9A and 9B illustrate a diagram of an example in which a device 1000 continuously uses a chatting service that has been used through a browser UI through the ChatON application installed on the device 1000 according to an exemplary embodiment.

Referring to FIG. 9A, the device 1000 may use the chatting service through the browser UI, and the device 1000 may transmit content to another device through the browser UI.

In addition, the device 1000 may determine when the chatting service in use is to be continuously used through the installed ChatON application by determining whether the transmission of the content has been completed. The device 1000 may use the chatting service through the browser UI until the transmission of the content is completed. As shown in FIG. 9B, when the transmission of the content is completed, the device may use the chatting service in use through the ChatON application.

In this case, the device 1000 may continuously use the chatting service in use through the ChatON application by synchronizing service data regarding text and content transmitted or received between another device with service data of the ChatON application to be used by the device 1000. The device 1000 may apply the service data regarding text and content transmitted to or received from another device to the ChatON application through the browser UI without modification of the service data.

Accordingly, the messages and content transmitted or received between the device 1000 and the other device 1000 may be displayed on the execution screen of the ChatON application, like the messages and content that have been displayed on the browser UI.

Figure 10A:
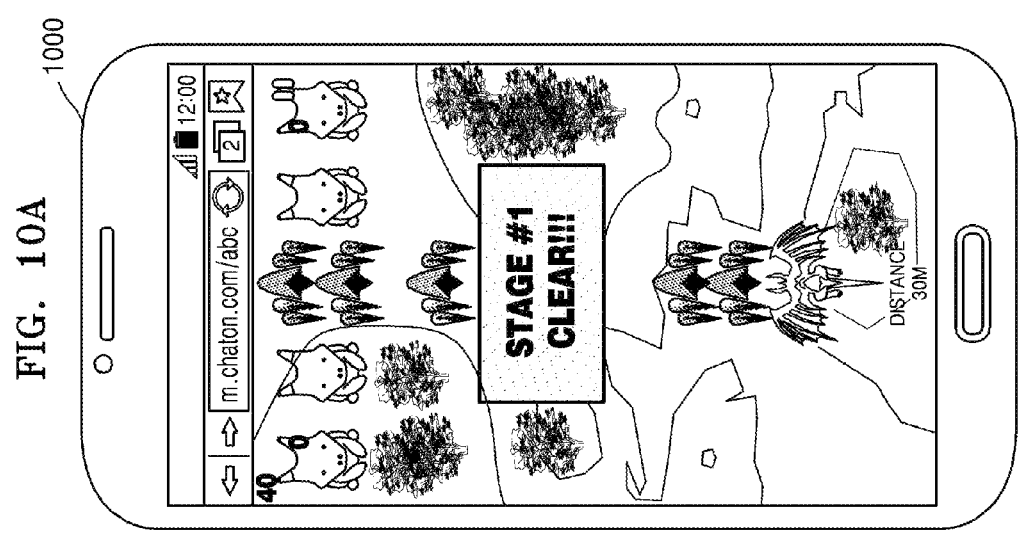
FIGS. 10A and 10B illustrate a diagram of an example in which a device 1000 continuously uses a game service that has been used through a browser UI through a game application installed in the device 1000 according to an exemplary embodiment.
Figure 10B:
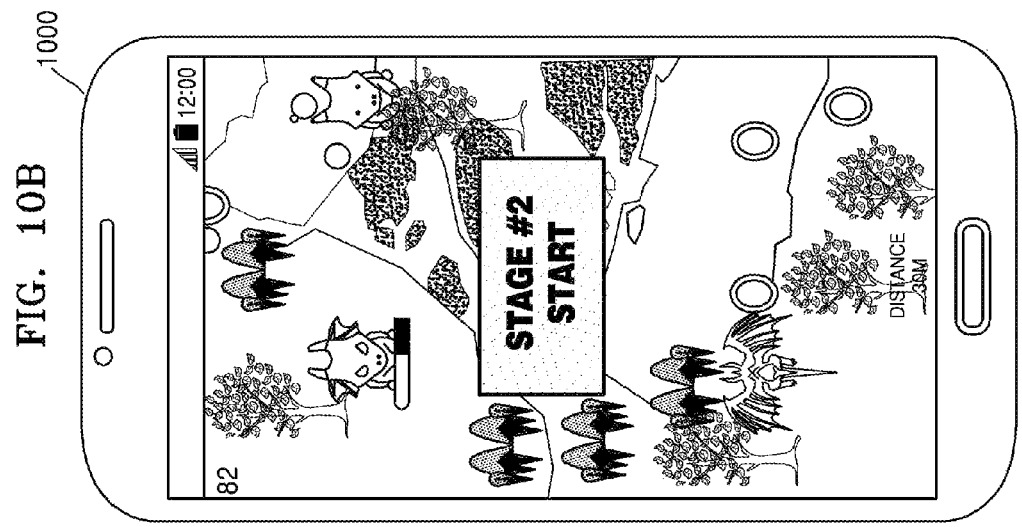

FIGS. 10A and 10B illustrate a diagram of an example in which a device 1000 continuously uses a game service that has been used through a browser UI through a game application installed in the device 1000 according to an exemplary embodiment.

Referring to FIG. 10A, the device 1000 may use the game service at stage #1 of a shooting game through the browser UI.

In addition, the device 1000 may determine when the game service in use is to be continuously used through the installed game application by determining whether stage #1 is over. The device 1000 may use the game service through the browser UI until stage #1 is over. As shown in FIG. 10B, when stage #1 is over, the device may use the game service in use through the game application.

In this case, the device may continuously use the game service in use through the game application by synchronizing service data of the game service stored until stage #1 is over with service data of the game application. The device 1000 may apply the service data of the game service stored until stage #1 is over with the game application without modification of the service data. Accordingly, a character state, a game score, and so on at stage #1 of the game may be applied to the game service used through the game application.

Figure 11:
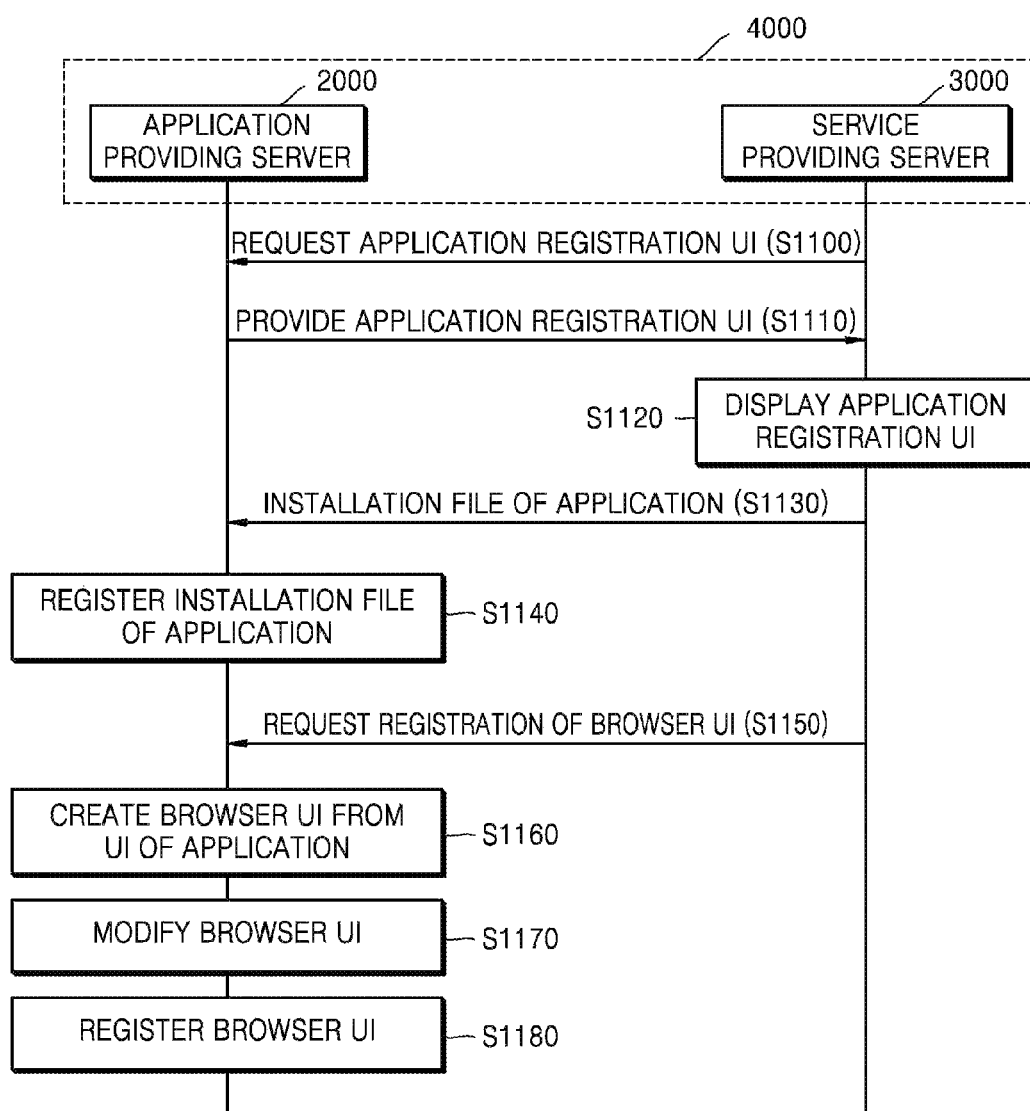
FIG. 11 illustrates a flowchart of a method of a service providing server 3000 registering an application and a browser UI of the application on an application providing server 2000 according to an exemplary embodiment.

FIG. 11 illustrates a flowchart of a method of a service providing server 3000 registering an application and a browser UI of the application on an application providing server 2000 according to an exemplary embodiment.

In operation S1100, the service providing server 3000 may request an application registration UI from the application providing server 2000. In operation S1110, the application providing server 2000 may provide the application registration UI to the service providing server 3000. The application registration UI may include a page for registering an installation file of the application and a page for registering the browser UI separately.

In operation S1120, the service providing server 3000 may display the application registration UI. The service providing server 3000 may receive a user input for registering an application and a browser UI of the application of the service providing server 3000 on the application providing server 2000 through the application registration UI.

In operation S1130, the service providing server 3000 may provide the installation file of the application to the application providing server 2000. In operation S1130, when a user input for registering the installation file of the application is received through the page for registering the installation file of the application of the displayed UI, the service providing server 3000 may provide the installation file of the application to the application providing server 2000.

In operation S1140, the application providing server 2000 may register the installation file of the application.

In operation S1150, the service providing server 3000 may request the application providing server 2000 to register the browser UI of the application. When a user input for registering the browser UI is received through the page for registering the browser UI of the application of the displayed UI, the service providing server 300 may request the application providing server 2000 to register the browser UI of the application.

In operation S1160, the application providing server 2000 may create the browser UI from the UI of the application. The application providing server 2000 may analyze an application UI from the installation file of the application and create the browser UI using the application UI.

In operation S1170, the application providing server 2000 may modify the browser UI. The service providing server 3000 may display a page for modifying the created browser UI and may provide an instruction for modifying the browser UI to the application providing server 2000 according to a user input received through the displayed page. In addition, the application providing server 2000 may modify the browser UI according to the provided command.

In operation S1180, the application providing server 2000 may register the created or modified browser UI. The application providing server 2000 may register and store the created or modified browser UI in association with the installation file of the application.

Figure 12A:
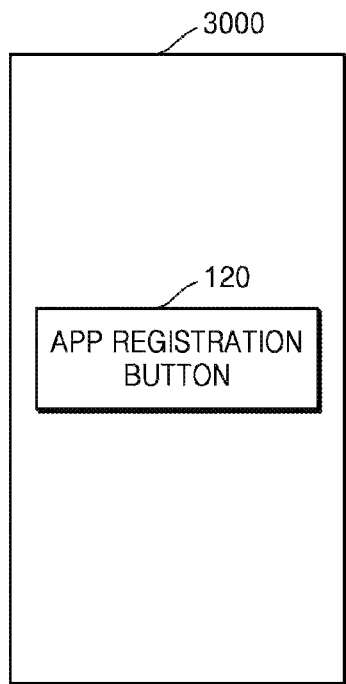
FIGS. 12A, 12B, and 13 illustrate diagrams of examples of an application registration user interface (UI) provided to a service providing server 3000 according to an exemplary embodiment.
Figure 12B:
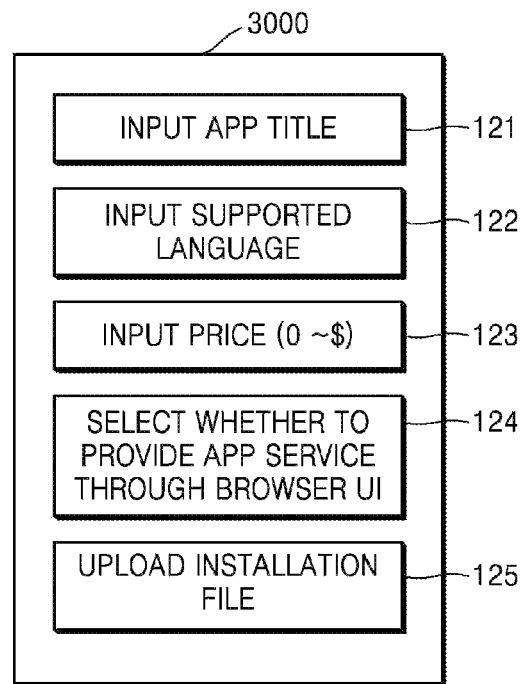
Figure 13:
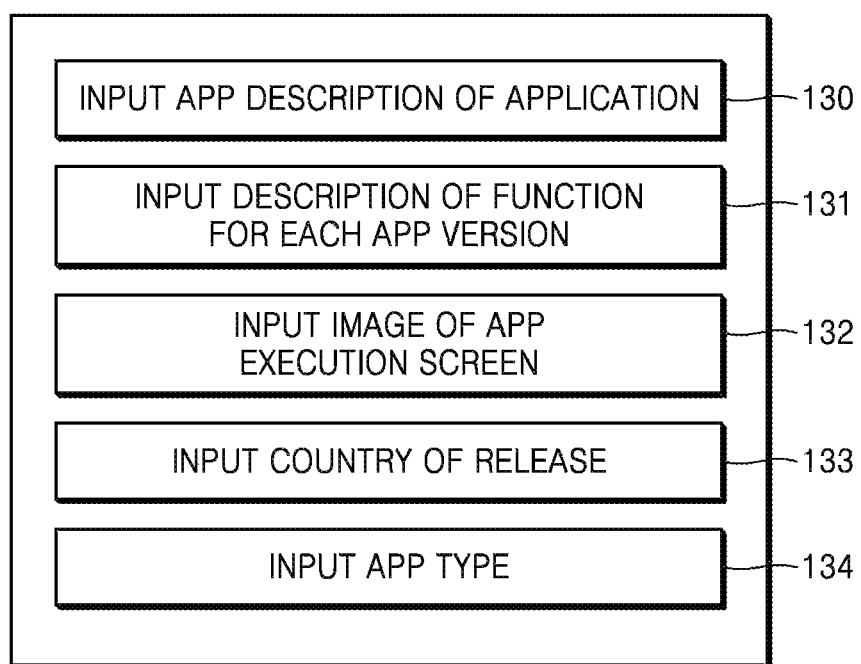

FIGS. 12A, 12B, and 13 illustrate diagrams of examples of a user interface (UI) for registering an application provided to a service providing server 3000 according to an exemplary embodiment.

Referring to FIG. 12A, the service providing server 3000 may display an application registration UI on a screen of a display device in the service providing server 3000. A button 120 for selecting application registration may be included in the application registration UI. In addition, when the user selects the button 120, as shown in FIG. 12B, a menu for inputting detail information of an application to be registered may be displayed in the application registration UI.

The menu for inputting the detail information of the application to be registered may include a field 121 for inputting a title of the application, a field 122 for inputting a language supported by the application, a field 123 for inputting a price of the application, a field 124 for registering a browser UI, and a field 125 for uploading an installation file of the application.

A user of the service providing server 3000 may select the field 121 for inputting a title of the application and then input the title of the application, select the field 122 for inputting a language supported by the application and then input the language supported by the application, and select the field 123 for inputting a price of the application and then input the price of the application.

Further, when the user of the service providing server 3000 selects the field 123 for registering a browser UI, a UI of FIG. 14 to be described below may be displayed on the screen of the display device in the service providing server 3000.

Also, the user of the service providing server 3000 may select the field 125 for uploading an installation file of the application and then select the installation file of the application. Accordingly, the service providing server 3000 may transmit the application installation file to the application providing server 2000.

In FIG. 12B, when the user enters an input for turning a page, as shown in FIG. 13, another menu for inputting detail information of the application to be registered may be displayed.

The other menu for inputting detail information of the application to be registered may include a field 130 for inputting a description of the application, a field 131 for describing a function for each version of the application, a field 132 for inputting a capture image of an execution screen of the application, a field 133 for inputting a country in which the application is released, and a field 134 for inputting a type of the application.

In addition, the user of the service providing server 300 may select the field 130 for inputting a description of the application and then input the description of the application and may select the field 131 for describing a function for each version of the application and then input the description of the function for each version of the application. In addition, the user of the service providing server 300 may select the field 132 for inputting a capture image of an execution screen of the application and then upload the image obtained by capturing the execution screen of the application to the application providing server 2000 and may select the field 133 for inputting a country in which the application is released and then input the country in which the application is released. In addition, the user of the service providing server 3000 may select the field 1134 for inputting a type of the application and then input the type of the application. The type of the application may include, for example, a game, education, a social network service (SNS), etc.

Figure 14:
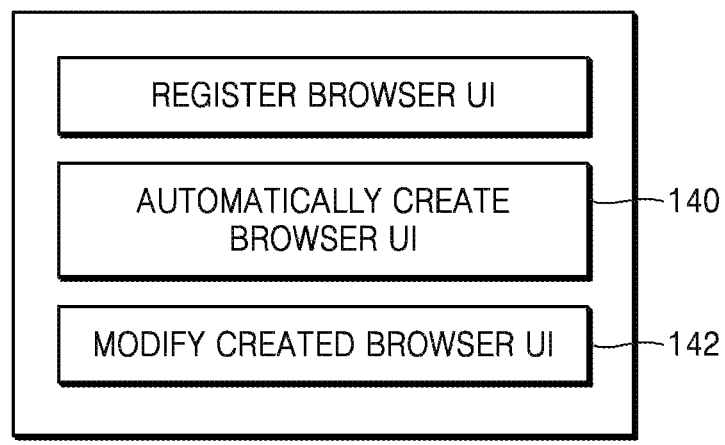
FIG. 14 illustrates an example of a menu for registering a browser UI of an application according to an exemplary embodiment.

FIG. 14 illustrates an example of a menu for registering a browser UI of an application according to an exemplary embodiment.

When the user of the service providing server 3000 selects the field 124 for registering a browser UI in FIG. 12B, as shown in FIG. 14, a menu for registering the browser UI of the application may be displayed on the screen of the display device in the service providing server 3000.

The menu for registering the browser UI of the application may include a browser UI auto-creation field 140 and a browser UI modification field 142. When the user of the service providing server 3000 selects the browser UI auto-creation field 140, the service providing server 3000 may request the application providing server 2000 to automatically create the browser UI. In addition, in response to the request, the application providing server 2000 may automatically create a browser UI of the application by analyzing a UI of the application of the service providing server 3000. The application providing server 2000 may create the browser UI by analyzing metadata such as text and a button included in the application UI and converting the application UI into a form of a language used by the browser of the device 1000.

In addition, when the user of the service providing server 3000 selects the browser UI modification field 142, the application providing server 2000 may provide a tool for modifying the browser ID to the service providing server 3000, and the service providing server 3000 may use the received tool to modify the browser UI.

The service providing server 3000 has been described in FIGS. 11 to 14 as registering the application of the service providing server 3000 in the application providing server 2000, but is not limited thereto. An external device that is not included in the service providing server 3000 may request the application providing server 2000 to register the application of the service providing server 3000 in the application providing server 20000. For example, a developer who has developed an application of the service providing server 3000 may use her or his own personal device to register the application on the application providing server 2000. However, the present embodiment is not limited thereto.

In FIGS. 11 to 14, the application providing server 2000 and the service providing server 3000 are described as separate servers, but are not limited thereto. The application providing server 2000 and the service providing server 3000 may be managed as one integration server 4000. In this case, the integration server 4000 may perform some or all operations of the application providing server 2000 and the service providing server 3000 shown in FIGS. 11 to 14.

Figure 15:
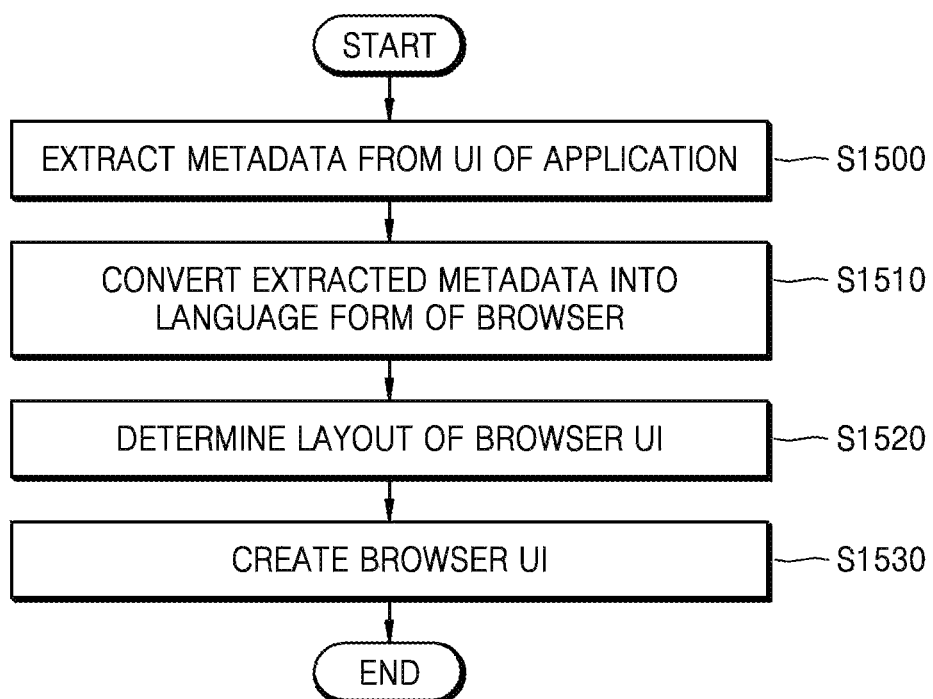
FIG. 15 illustrates a flowchart of a method of an application providing server 2000 creating a browser UI according to an exemplary embodiment.

FIG. 15 illustrates a flowchart of a method of an application providing server 2000 creating a browser UI according to an exemplary embodiment.

In operation S1500, the application providing server 2000 may extract metadata from the application UI. The application providing server 2000 may extract the metadata of the application UI from an installation file of the application. The metadata of the application UI may include information regarding a layout of the application UI and text, an image, and a button in the application UI.

In operation S1510, the application providing server 2000 may convert the extracted metadata into a language form used by the browser. When there are a plurality of types of the browser installed or to be installed on the device 1000, the application providing server 2000 may identify a language form used by the browser for each type of the browser and convert the metadata into each language form. In addition, the language used by the browser may include the language form such as, for example, Hypertext Markup Language 5 (HTML5), Cascading Style Sheets 3 (CSS3), and JavaScript.

In operation S1520, the application providing server 2000 may determine a layout of the browser UI. The application providing server 2000 may analyze the application UI and determine a frame of the browser UI and text, an image, and a button to be included in the browser UI according to a result of the analysis. In addition, the application providing server 2000 may determine positions of the determined text, image, and button in the determined frame. Assuming that the service providing server 3000 sets elements to be included in the browser UI and elements not to be included in the browser UI in advance among elements included in the application UI, the application providing server 2000 may determine a layout of the browser UI according to the setting.

In operation S1530, the application providing server 2000 may create the browser UI. The application providing server 2000 may use the metadata converted in operation S1510 to create the browser UI according to the layout determined in operation S1520.

In FIG. 15, the application providing server 2000 and the service providing server 3000 are described as separate servers, but are not limited thereto. The application providing server 2000 and the service providing server 3000 may be managed as one integration server 4000. In this case, the integration server 4000 may perform some or all operations of the application providing server 2000 and the service providing server 3000 shown in FIG. 15.

Figure 16:
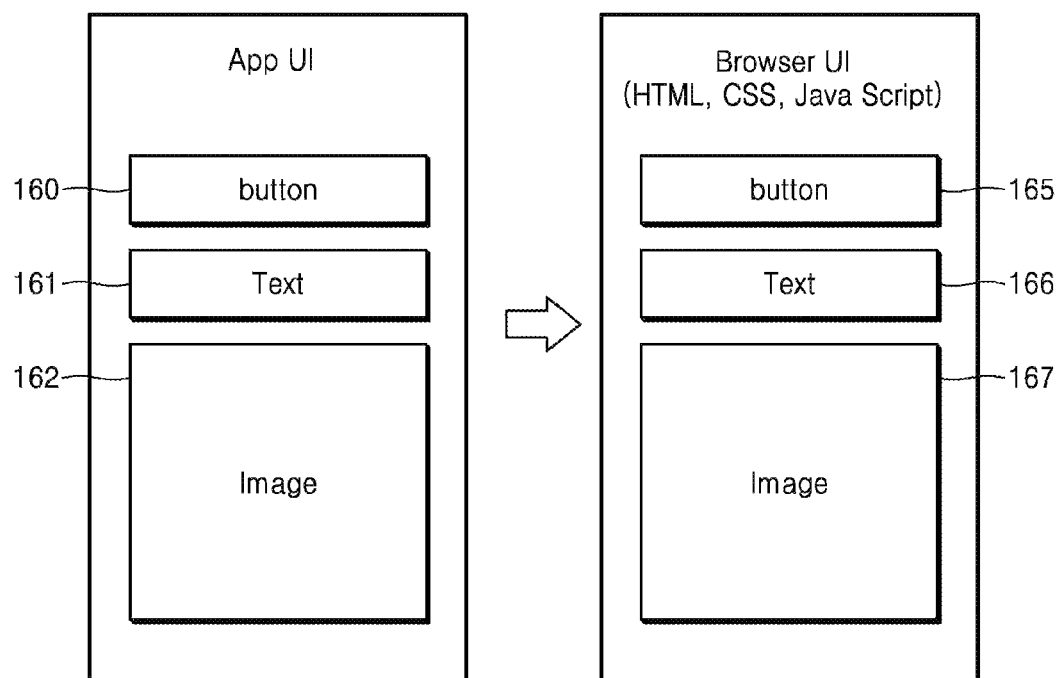
FIG. 16 illustrates a diagram of an example of a browser UI created from a UI of an application according to an exemplary embodiment.

FIG. 16 illustrates a diagram of an example of a browser UI created from a UI of an application according to an exemplary embodiment.

Referring to FIG. 16, the application providing server 2000 or the integration server 4000 may identify a button 160, text 161, and an image 162 included in the application UI by extracting metadata of the application UI and analyzing the extracted metadata. In addition, the application providing server 2000 or the integration server 4000 may create a browser UI including a button 165, text 166, and an image 167, which have a language form of a browser, on the basis of attributes of the button 160, the text 161, and the image 162. For example, the language form of the browser may include, but is not limited to HTML, CSS, and JavaScript.

The application UI of FIG. 16 may include the button 160, the text 161, and the image 162. In addition, a browser UI created from the application UI may include a button 165 corresponding to the button 160, text 166 corresponding to the text 161, and an image 167 corresponding to the image 162.

The shape of the button 165 may be the same as or similar to that of the button 160. In addition, the position of the button 160 in the application UI may be the same as or similar to the position of the button 165 in the browser UI. In addition, the shape of the text 166 may be the same as or similar to the shape of the text 161. Furthermore, the position of the text 161 in the application UI may be the same as or similar to the position of the text 166 in the browser UI. The shape of the image 167 may be the same as or similar to the shape of the image 162. Furthermore, the position of the image 162 in the application UI may be the same as or similar to the position of the image 167 in the browser UI.

Figure 17:
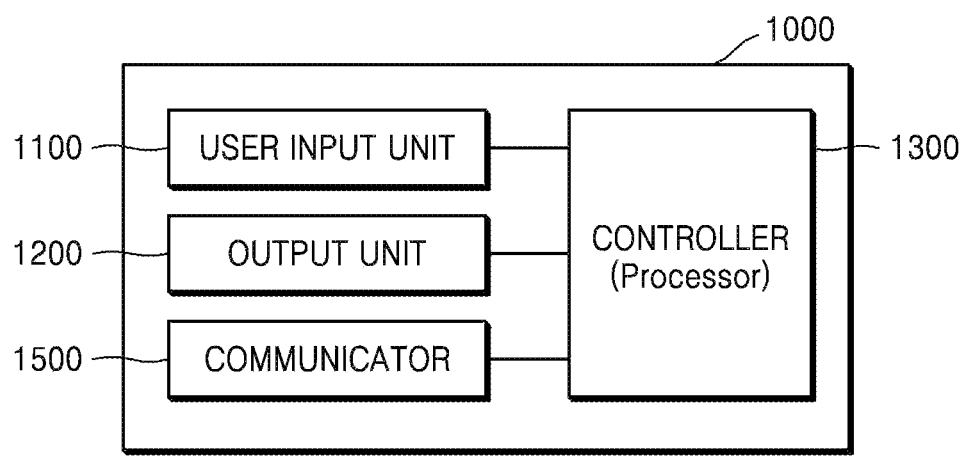
FIGS. 17 and 18 illustrate block diagrams of a device 1000 according to an exemplary embodiment.
Figure 18:
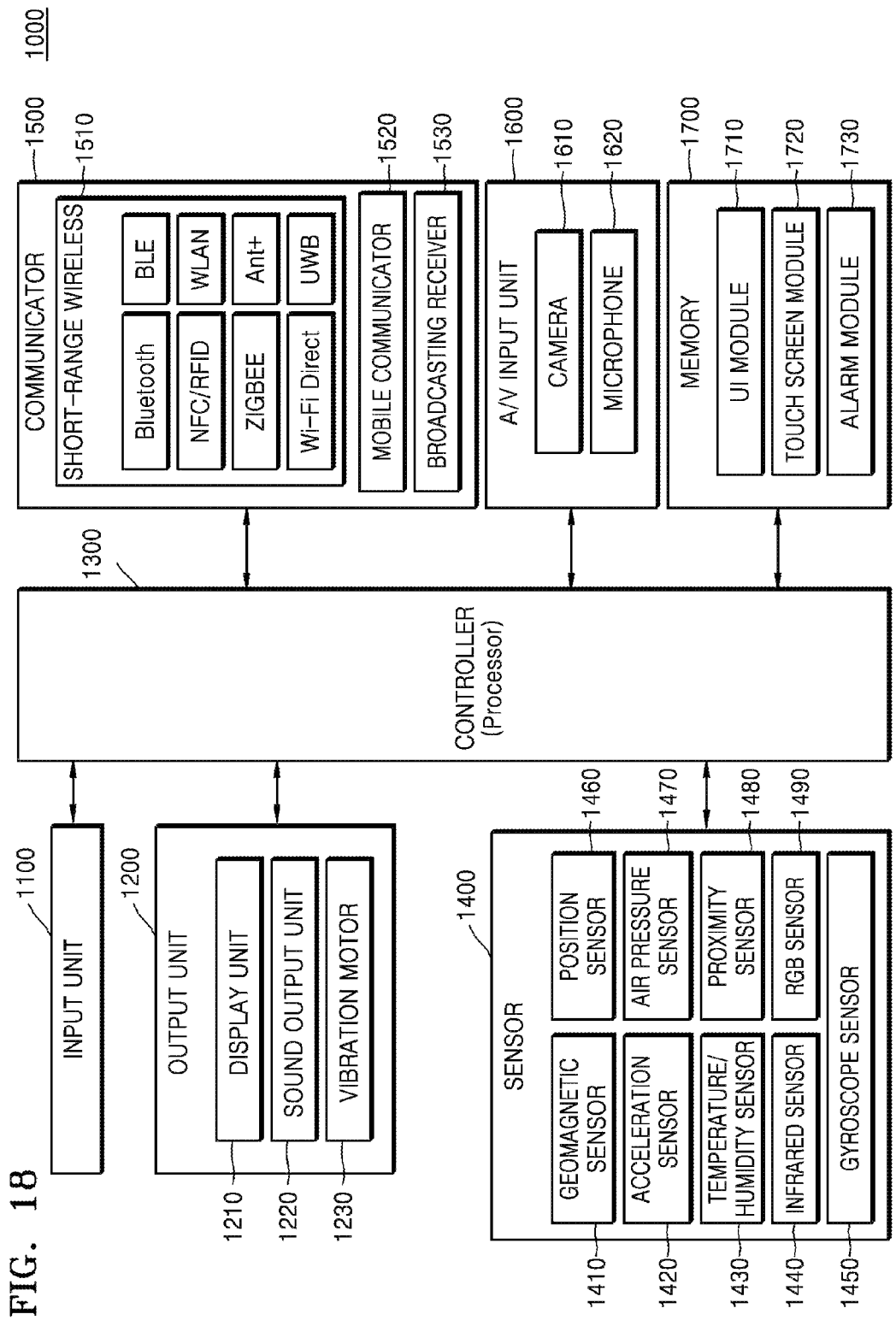

FIGS. 17 and 18 illustrate block diagrams of a device 1000 according to an exemplary embodiment.

As shown in FIG. 17, the device 1000 may include a user input unit 1100, an output unit 1200, a controller 1300, and a communicator (e.g., communication interface) 1500. However, not all of the elements shown in FIG. 17 are essential to the device 1000. The device 1000 may be implemented with more elements than those shown in FIG. 17 or may be implemented with fewer elements than those shown in FIG. 16.

For example, as shown in FIG. 18, the device 1000 may further include a sensor 1400, an audio/video (A/V) input unit 1600, and a memory 1700 in addition to the user input unit 1100, the output unit 1200, the controller 1300, and the communicator 1500.

The user input unit 1100 denotes a unit that allows a user to enter information or data to control the device 1000. Examples of the user input unit 1100 may include, but are not limited to, a key pad, a dome switch, a touch pad (a contact capacitance type, a pressure resistance type, an infrared sensing type, a surface ultrasonic wave conduction type, an integral tension measurement type, a piezoelectric effect type, etc.), a jog wheel, a jog switch, etc.

The user input unit 1100 may receive an application and a browser UI of the application of the service providing server 3000 and may receive a user input for using a service of the service providing server 3000.

The output unit 1200 may output an audio signal, a video signal, and/or a vibration signal. The output unit 1200 may include a display unit 1210, a sound output unit 1220, and a vibration motor 1230.

The display unit 1210 outputs information processed in the device 1000. For example, the display unit 1210 may display the browser UI of the application through a browser installed on the device 1000. In addition, the display unit 1210 may display an execution screen of the application of the service providing server 3000.

When the display unit 1210 and the touch pad form a 1-layer structure and thus are implemented as a touch screen, the display unit 1210 may be used as an input device in addition to an output device. The display unit 1210 may include at least one of a liquid crystal display (LCD), a thin film transistor-LCD (TFT-LCD), an organic light emitting diode (OLED) display, a flexible display, a three-dimensional (3D) display, and an electrophoretic display. The device 1000 may include two or more display units 1210 according to the implementation of the device 1000. In this case, the two or more display units 1210 may be disposed to face each other using a hinge.

The sound output unit 1220 outputs audio data received from the communicator 1500 or stored in the memory 1700. The sound output unit 1220 may output an acoustic signal related to a function (e.g., a call signal reception sound, a message reception sound, or an alarm sound) performed by the device. The sound output unit 1220 may include a speaker, a buzzer, etc.

The vibration motor 1230 may output a vibration signal. For example, the vibration motor 1230 may output a vibration signal corresponding to output of audio data or video data (e.g., a call signal reception sound, a message reception sound, etc.). In addition, the vibration motor 1230 may output the vibration signal when a touch is input to the touch screen.

The controller 1300 typically controls an overall operation of the device 1000. For example, the controller 1300 may control overall operations of the user input unit 1100, the output unit 1200, the sensor 1400, the communicator 1500, the A/V input unit 1600, and so on by executing programs stored in the memory 1700. The controller 1300 may perform the operations of the device 1000 in FIGS. 1 to 16 by controlling the user input unit 1100, the output unit 1200, the sensor 1400, the communicator 1500, the A/V input unit 1600, and so on.

In detail, the controller 1300 may request an application for using the service of the service providing server 3000 from the application providing server 2000. The controller 1300 may access an application market of the application providing server 2000 and request the application of the service providing server 3000 from the application providing server 2000. The controller 1300 may request a file for installing or updating the application from the application providing server 2000. The application market may include, but is not limited to Galaxy Apps, Google Play, and App Store.

The controller 1300 may receive the browser UI to be displayed through the browser installed on the device 1000 from the application providing server 2000. The browser UI is a UI for using the service of the service providing server 3000 and may be a UI that may be displayed through the browser installed on the device 1000. The browser UI may be a UI that is converted from a UI of an application for receiving the service of the service providing server 3000. For example, the browser may include, but is not limited to, a Hypertext Markup Language 5 (HTML5)-based browser, a Cascading Style Sheets 3 (CSS3)-based browser, and a JavaScript-based browser.

In this case, in response to the application providing request, the application providing server 2000 may provide the browser UI of the service providing server 3000 to the device 1000 while providing an installation file or an update file of the application to the device 1000. In addition, the browser UI may be registered on the application providing server 2000 by the service providing server 3000 in advance.

The controller 1300 may use the browser UI to receive the service from the service providing server 3000. The controller 1300 may execute a preset browser and display the browser UI on the screen of the device 1000 through the executed browser. Furthermore, the controller 1300 may receive a service from the service providing server 3000 according to a user input received through the browser UI.

The controller 1300 may receive the application from the application providing server 2000 while receiving the service from the service providing server 3000 through the browser UI. In response to the application providing request, the application providing server 2000 may transmit the installation file or update file of the application and the browser UI of the service providing server 3000 together.

The controller 1300 may execute the received application. The controller 1300 may install the application received from the application providing server 2000 on the device 1000 and execute the installed application while using the browser UI to receive the service of the service providing server 3000.

The controller 1300 may use the executed application to continuously receive a service being received through the browser UI. The controller 1300 may stop receiving the service through the browser UI and continuously execute the stopped service through the executed application. The controller 1300 may receive log information regarding the service being received through the browser UI from the service providing server 3000 and may use the received log information to synchronize service data being used through the browser UI with service data to be used through the executed application.

The controller 1300 may perform the following operations in order to change an agent that executes the application for the service of the service providing server 3000.

The controller 1300 may determine whether the installation of the application has been completed. The controller 1300 may download the installation file of the application from the application providing server 2000 in the background of the device 1000 and then install the downloaded installation file while receiving the service from the service providing server 3000 through the browser UI. In addition, the controller 1300 may control the download and installation of the application according to a resource occupancy rate of the device 1000.

When it is determined that the installation of the application has been completed, the controller 1300 may check a usage status of the service received through the browser UI. For example, assuming that the service is a game service, the controller 1300 may check a progress status of the game. Alternatively, for example, assuming that the service is a chatting service, the controller 1300 may check whether messages or content is being transmitted or received between users. Alternatively, for example, assuming that the service is a search service, the controller 1300 may check whether a user input for search is being received or the search is in progress.

The controller 1300 may determine whether to receive the service from the service providing server 3000 through the application installed on the device 1000. The controller 1300 may determine whether to receive the service that has been received through the browser UI through the application installed on the device 1000 by determining whether the service usage status is a predetermined status. For example, assuming the service is a game service, the controller 1300 may determine to receive the game service through the application installed on the device 1000 when it is determined that a certain stage of the game is over. Alternatively, for example, assuming the service is a chatting service, the controller 1300 may determine to receive the chatting service through the application installed on the device 1000 when it is determined that transmission or reception of messages or content between users has been completed. Alternatively, for example, assuming the service is a search service, the controller 1300 may determine to receive the search service through the application installed on the device 1000 when it is determined that an input of a keyword for search by a user has been completed or the search based on the keyword has been completed. In addition, for example, the controller 1300 may determine to receive the service that has been received through the browser UI through the application installed on the device 1000 when a page of the browser UI displayed on the screen is switched to another page.

The controller 1300 may receive log information regarding the service in use from the service providing server 3000. For example, assuming the service is a game service, the log information may include information regarding a current state of a game character, a progress status of a game, etc. Alternatively, for example, assuming that the service is a chatting service, the log information may include information regarding a conversation between users, content transmitted or received between users, etc. Alternatively, for example, assuming that the service is a search service, the log information may include information regarding a search history of a user.

The controller 1300 may execute the installed application and end the display of the browser UI. The controller 1300 may end the display of the browser UI by ending the execution of the browser that displays the browser UI.

The controller 1300 may synchronize service data used through the browser UI with service date to be used through the application. The controller 1300 may use the log information regarding the service to synchronize service data at the time at which the display of the browser UI is ended with service data to be used through the application. Accordingly, a user may continuously use the service used through the browser UI through the application installed on the device 1000.

The sensor 1400 may sense a state of the device 1000 or a state surrounding the device 1000 and may deliver the sensed information to the controller 1300.

The sensor 1400 may include, but is not limited to at least one of a magnetic sensor 1410, an acceleration sensor 1420, a temperature/humidity sensor 1430, an infrared sensor 1440, a gyroscope sensor 1450, a positioning sensor 1460 (e.g., a Global Positioning System (GPS) sensor), an air pressure sensor 1470, a proximity sensor 1480, and an RGB sensor (illumination sensor) 1490. A function for each sensor may be directly inferred from its name by those skilled in the art, and thus its detailed description will be omitted.

The communicator 1500 may include one or more elements for communicating with the application providing server 2000 and the service providing server 3000. For example, the communicator 1500 may include a short-range wireless communicator 1510, a mobile communicator 1520, and a broadcast receiver 1530.

The short-range wireless communicator 1510 may include, but is not limited to a Bluetooth communicator, a Bluetooth low energy (BLE) communicator, a near field communicator, a wireless LAN (WLAN) communicator, a Zigbee communicator, an Infrared Data Association (IrDA) communicator, a Wi-Fi Direct (WFD) communicator, a ultra wideband (UWB) communicator, and an Ant+ communicator.

The mobile communicator 1520 transmits and receives a radio signal to and from at least one of a base station, an external terminal, and a server on a mobile communication network. The radio signal may include a voice call signal, a video call signal, or various forms of data according to transmission and/or reception of a text and/or multimedia message.

The broadcast receiver 1530 receives a broadcast signal and/or broadcast-related information from the outside over a broadcast channel. The broadcast channel may include a satellite channel and a terrestrial channel. Depending on the implementation, the device 1000 may not include the broadcast receiver 1530.

In addition, the communicator 1500 may transmit and receive, to and from the application providing server 2000 and the service providing server 3000, information needed to receive the service that has been received through the browser UI of the application of the service providing server 3000 through the application of the service providing server 3000.

The A/V input unit 1600 is configured to input an audio signal or video signal and may include a camera 1610 and a microphone 1620. The camera 1610 may obtain a picture frame of a still picture or video through an image sensor in a video call mode or image capturing mode. An image captured through the image sensor may be processed through the controller 1300 or a separate image processing unit.

The picture frame processed by the camera 1610 may be stored in the memory 1700 or transmitted to the outside via the communicator 1500. Two or more cameras 1610 may be provided according to a configuration aspect of the terminal.

The microphone 1620 receives and processes an external acoustic signal into electrical voice data. For example, the microphone 1620 may receive an acoustic signal from an external device or a speaker. The microphone 1620 may use various noise removal algorithms for removing noise generated while receiving the external acoustic signal.

The memory 1700 may store a program for processing and controlling the controller 1300 and may also store data that is input to the device 1000 and output from the device 1000.

The memory 1700 may include a flash memory type, hard disk type, multimedia card micro type, or card type memory (e.g., an SD or XD memory), or at least one type of storage medium of a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

Programs stored in the memory 1700 may be classified into a plurality of modules according to the functions of the programs and, for example, may be classified into a UI module 1710, a touch screen module 1720, an alarm module 1730, and so on.

The UI module 1710 may provide a specialized UI, GUI, or the like, which is in cooperation with the device 1000 for each application. The touch screen module 1720 may sense a touch gesture of a user on a touch screen and deliver information regarding the touch gesture to the controller 1300. The touch screen module 1720 according to some embodiments may recognize and analyze a touch code. The touch screen module 1720 may be configured as separate hardware including a controller.

In order to sense a touch or a proximity touch on the touch screen, various sensors may be provided inside or near the touch screen. An example of the sensor for sensing the touch on the touch screen is a tactile sensor. The tactile sensor denotes a sensor that senses a touch by a specific object to a degree that a human can feel or more. The tactile sensor may sense various pieces of information such as a roughness of a touched surface, a stiffness of a touched object, a temperature of a touched point, etc.

Moreover, an example of the sensor for sensing the touch of the touch screen is a proximity sensor.

The proximity sensor denotes a sensor that uses an electromagnetic force or infrared light to detect an object approaching a detection surface or an object near the detection surface without any mechanical contact. Examples of the proximity sensor include a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor. Examples of a user's touch gesture may include a tap, a touch and hold, a drag, panning, a flick, a drag and drop, and a swipe.

The alarm module 1730 may generate a signal for alarming of occurrence of an event in the device 1000. Examples of the event occurring in the device 1000 may include reception of a call signal, reception of a message, input of a key signal, and notice of schedule. The alarm module 1730 may output an alarm signal in the form of a video signal through the display unit 1210, output an alarm signal in the form of an audio signal through the sound output unit 1220, and output an alarm signal in the form of a vibration signal through the vibration motor 1230.

Figure 19:
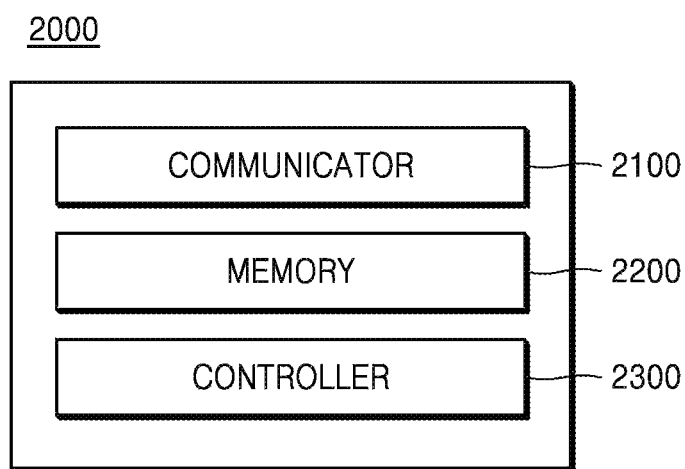
FIG. 19 illustrates a block diagram of an application providing server 2000 according to an exemplary embodiment.

FIG. 19 illustrates a block diagram of an application providing server 2000 according to an exemplary embodiment.

Referring to FIG. 19, the application providing server 2000 may include a communicator 2100, a memory 2200, and a controller 2300.

The communicator 2100 may include one or more elements for communicating with the service providing server 3000 and the device 1000. The communicator 2100 may transmit to and receive from the service providing server 3000 information for registering an application of the service providing server 3000 on the application providing server 2000. In addition, the communicator 2100 may transmit to and receive from the device 1000 information for providing an application and a browser UI of the application of the service providing server 3000.

The memory 2200 may store the information for registering the application of the service providing server 3000 on the application providing server 2000 and the information for providing the application and the browser UI of the application of the service providing server 3000.

Typically, the controller 2300 may control an overall operation of the application providing server 2000. For example, the controller 2300 may control overall operations of the communicator 2100 and the memory 2200 by executing programs stored in the memory 2200.

The controller 2300 may register the application and the browser UI of the application of the service providing server 3000. The controller 2300 may provide an application registration UI to the service providing server 3000. The application registration UI may include a page for registering an installation file of the application and a page for registering the browser UI separately. The controller 2300 may register the application installation file received from the service providing server 3000 through the UI provided to the service providing server 3000. In addition, in response to the browser UI registration request requested from the service providing server 3000 through the UI provided to the service providing server 3000, the controller 230 may create and register the browser UI. The controller 2300 may analyze an application UI from the application installation file and may create the browser UI using the application UI. The controller 2300 may modify the browser UI. The service providing server 3000 may display a page for modifying the created browser UI and may provide an instruction for modifying the browser UI to the application providing server 2000 according to a user input received through the displayed page. The controller 2300 may modify the browser UI according to the received instruction. The controller 2300 may register the created or modified browser UI. The controller 2300 may register and store the created or modified browser UI in association with the installation file of the application.

In detail, the controller 2300 may create the browser UI as follows.

The controller 2300 may extract metadata from the application UI. The controller 2300 may extract the metadata of the application UI from the application installation file. The metadata of the application UI may include information regarding a layout of the application UI and text, an image, and a button in the application UI.

The controller 2300 may convert the extracted metadata into a language form used by the browser. When there are a plurality of types of the browser installed or to be installed on the device 1000, the application providing server 2000 may identify a language form used by the browser for each type of the browser and convert the metadata into each language form. In addition, the language used by the browser may include the language form such as, for example, Hypertext Markup Language 5 (HTML5), Cascading Style Sheets 3 (CSS3), and JavaScript.

The controller 2300 may determine a layout of the browser UI. The application providing server 2000 may analyze the application UI and determine a frame of the browser UI and text, an image, and a button to be included in the browser UI according to a result of the analysis. In addition, the controller 2300 may determine positions of the determined text, image, and button in the determined frame. Assuming that the service providing server 3000 sets elements to be included in the browser UI and elements not to be included in the browser UI in advance among elements included in the application UI, the controller 2300 may determine a layout of the browser UI according to the setting.

The controller 2300 may create the browser UI. The controller 2300 may use the converted metadata to create the browser UI according to the determined layout.

Figure 20:
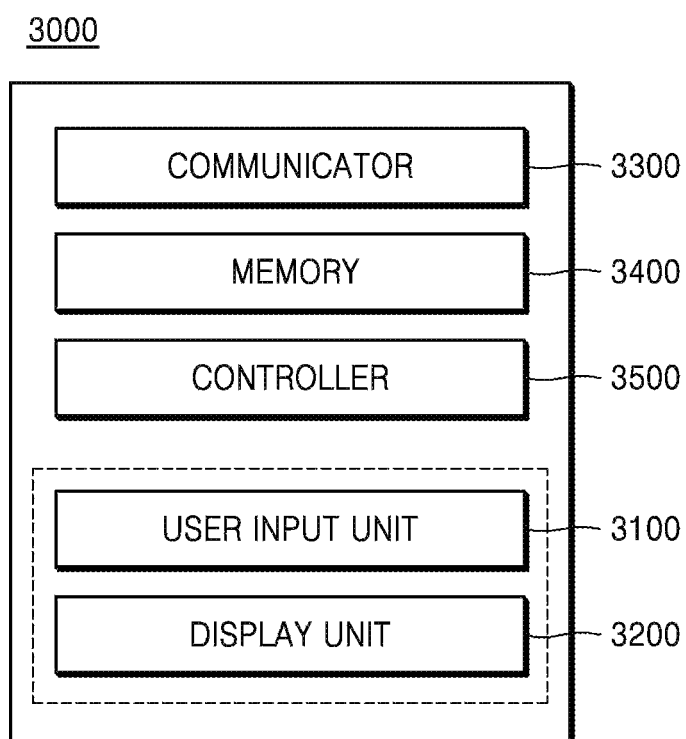
FIG. 20 illustrates a block diagram of a service providing server 3000 according to an exemplary embodiment.

FIG. 20 illustrates a block diagram of a service providing server 3000 according to an exemplary embodiment.

Referring to FIG. 20, the service providing server 3000 may include a communicator 3300, a memory 3400, and a controller 3500 and may selectively include a user input unit 3100 and a display unit 3200. The user input unit 3100 and the display unit 3200 may not be included in the service providing server 3000, but may be included in a separate device other than the service providing server 3000.

The user input unit 3100 may receive a user input for registering an application of the service providing server 3000 on the application providing server 2000.

The display unit 3200 may display a UI for registering the application of the service providing server 3000 on the application providing server 2000.

The communicator 3300 may include one or more elements for communicating with the application providing server 2000 and the device 1000. The communicator 3300 may transmit to and receive from the application providing server 2000 information for registering the application of the service providing server 3000 on the application providing server 2000. In addition, the communicator 3300 may transmit to and receive from the device 1000 information regarding a service provided by the service providing server 3000.

The memory 3400 may store the information for registering the application of the service providing server 3000 on the application providing server 2000 and the information regarding the service provided by the service providing server 3000.

Typically, the controller 3500 may control an overall operation of the service providing server 3000. For example, the controller 3500 may control overall operations of the user input unit 3100, the display unit 3200, the communicator 3300, and the memory 3400 by executing programs stored in the memory 3400.

The controller 3500 may receive a service providing request through the browser UI from the device 1000 and may execute an application corresponding to the browser UI displayed on the device 1000 in response to the service providing request from the device 1000. In this case, the application may be stored in the service providing server 3000 in advance. The controller 3500 may execute various types of software programs for providing the service in addition to the application for providing the service.

The controller 3500 may provide the service to the device 1000 through the application executed on the service providing server 3000. For example, when the service providing server 3000 provides a game service, a user of the device 1000 may manipulate a game through the browser UI and use a web-based game service provided from the service providing server 3000. The device 1000 may provide a user input received through the browser UI to the service providing server 3000, execute an application for the game service according to the provided user input, and provide a result of the execution of the application to the device 1000.

The controller 3500 may store log information regarding the currently provided service. The log information regarding the service may be information indicating a service usage history of a user who uses the service. The log information may be a server log file which is created and maintained by the service providing server 3000, and the log information includes a list of activities performed by the service providing server 3000 upon user requests or inputs. The log information regarding the service may include event information that is generated by the execution of the application for using the service. For example, assuming the service is a game service, the log information may include information regarding a current state of a game character, a progress status of a game, etc. Alternatively, for example, assuming that the service is a chatting service, the log information may include information regarding a conversation between users, content transmitted or received between users, etc. Alternatively, for example, assuming that the service is a search service, the log information may include information regarding a search history of a user.

When the installation of the application has been completed, the device 1000 may request the service providing server 3000 to transfer the service. In response to the service transfer request, the controller 3500 may provide the log information regarding the currently provided service to the device 1000. The controller 3500 may provide log information up to the time at which the service transfer request is received to the device 1000.

In addition, when the display of the browser UI through the browser installed on the device 1000 is ended, the controller 3500 may end an application being executed on the service providing server 3000. The controller 3500 may end some or all functions of the application being executed on the service providing server 3000. For example, the controller 3500 may end a function performed by the application executed on the device 1000 among functions being executed on the service providing server 3000.

The controller 3500 may continuously provide the service that has been provided to the device 1000 through the browser UI through the application executed on the device 1000. The controller 3500 may provide the service to the device 1000 in cooperation with the browser using the browser UI. Subsequently, the controller 3500 may stop the cooperation with the browser and may continuously provide the service to the device 1000 in cooperation with the application executed on the device 1000.

The controller 3500 may request the application registration UI to the application providing server 2000 and may receive the application registration UI for the service providing server 3000 from the application providing server 2000. The application registration UI may include a page for registering an installation file of the application and a page for registering the browser UI separately.

The controller 3500 may display the application registration UI. The controller 3500 may receive a user input for registering the application and the browser UI of the application of the service providing server 3000 in the application providing server 2000 through the application registration UI.

The controller 3500 may provide the installation file of the application to the application providing server 2000. When a user input for registering the installation file of the application is received through the page for registering the installation file of the application of the displayed UI, the controller 3500 may provide the application installation file to the application providing server 2000. Subsequently, the application providing server 2000 may register the application installation file.

The controller 3500 may request the application providing server 2000 to register the browser UI of the application. When a user input for registering the browser UI is received through the page for registering the browser UI of the application of the displayed UI, the controller 3500 may request the application providing server 2000 to register the browser UI of the application. Subsequently, the application providing server 2000 may create and register the browser UI of the application in response to the request.

The controller 3500 may request the application providing server 2000 to modify the browser UI created by the application providing server 2000. In addition, the controller 3500 may provide information for modifying the browser UI to the application providing server 2000.

The application providing server 2000 and the service providing server 3000 may be managed as one integration server 4000. In this case, the integration server 4000 may include elements of FIGS. 19 and 20. In addition, the communicator 2100 and the communicator 3330 may be integrated as one element, the memory 2200 and the memory 3400 may be integrated as one element, and the controller 2300 and the controller 3500 may be integrated as one element.

While not restricted thereto, an exemplary embodiment can be embodied as computer-readable code on a computer-readable recording medium. The computer-readable recording medium is any data storage device that can store data that can be thereafter read by a computer system. A computer readable medium may be any usable medium accessible by a computer and may include volatile and non-volatile media and discrete and integrated media. Also, the computer readable medium may include both a computer storage medium and a communication medium. The computer storage medium includes the volatile and non-volatile media and the discrete and integrated media, which are implemented in any method or technique for storing information such as a computer readable instruction, data structure, program module, or other data. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication module typically includes the computer readable instruction, data structure, program module, or other data and transmission mechanism of a modulated data signal such as a carrier and further includes any information transmission medium. An exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium In this disclosure, the term "unit" may denote a hardware component such as a processor or circuit or a software component executed by the hardware component such as a processor.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of a device receiving a service from a service providing server using an application, the method comprising:
   requesting the server to transmit an installation file of an application and a web browser-based user interface (UI) to be displayed on a web browser corresponding to a service;
   displaying, on the web browser, the web browser-based UI corresponding to the service while the installation file of the application that provides the service is being downloaded;
   receiving user data which is input in association with the service through the web browser-based UI on the web browser while the installation file of the application that provides the service is being downloaded;
   installing the application corresponding to the service on the device, based on completion of downloading the installation file of the application; and
   executing the installed application and providing the user data through the installed application,
   wherein the user data is server log information associated with the service, and the method further comprises:
   retrieving the server log information received through the web browser-based UI from the server;
   using the server log information to continuously receive the service through the executed application after the web browser displaying the web browser-based UI is closed;
   ending display of the web browser-based UI and applying the server log information, which has been stored at the end of the display of the web browser-based UI, to the service to be received through the executed application; and
   synchronizing service data received through the web browser-based UI up to an end time with service data to be received through the executed application.

2. The method of claim 1, further comprising executing the web browser installed on the device, displaying the web browser-based UI on a screen of the device through the executed web browser, and receiving the service from the server based on the user data received through the displayed web browser-based UI.

3. The method of claim 1, further comprising requesting an update file of the application.

4. The method of claim 1, wherein the web browser-based UI is registered on an application providing server by the server in addition to the installation file of the application or an update file of the application.

5. A device that receives a service from a service providing server using an application, the device comprising:
   a memory;
   a communication interface configured to communicate with the server; and
   at least one hardware processor configured to:
   control the communication interface to request the server to transmit an installation file of an application and a web browser-based user interface (UI) to be displayed on a web browser corresponding to a service,
   display, on the web browser, the web browser-based UI corresponding to the service while the installation file of the application that provides the service is being downloaded,
   receive user data which is input in association with the service through the web browser-based UI while the installation file of the application that provides the service is being downloaded,
   install the application corresponding to the service on the device, based on completion of downloading the installation file of the application, and
   execute the application, and provide the user data through the executed application,
   wherein the user data is server log information associated with the service, and the hardware processor is further configured to use the server log information to continuously receive the service through the executed application after the web browser displaying the web browser-based UI is closed,
   wherein the hardware processor is further configured to end display of the web browser-based UI and apply the server log information, which has been stored at the end of the display of the web browser-based UI, to the service to be received through the executed application, and
   wherein the hardware processor is further configured to synchronize service data received through the web browser-based UI up to an end time with service data to be received through the executed application.

6. The device of claim 5, wherein the hardware processor is further configured to execute the web browser installed on the device, display the web browser-based UI on a screen of the device through the executed web browser, and receive the service from the server based on the user data received through the displayed web browser-based UI.

7. The device of claim 5, wherein the at least one hardware processor is further configure to request an update file of the application.

8. The device of claim 7, wherein the web browser-based UI is registered on an application providing server by the server in addition to the installation file of the application or the update file of the application.

9. The device of claim 8, wherein the web browser-based UI is automatically converted from a UI of the application by the application providing server.

10. The device of claim 9, wherein the hardware processor is further configured to download the requested update file of the application in a background of the device and execute the update file of the application.

11. The device of claim 5, wherein an application providing server and the server are managed by one provider.

12. A non-transitory computer-readable storage medium storing a program that is executable by a computer to perform a method of a device receiving a service from a service providing server using an application, the method comprising:

requesting the server to transmit an installation file of an application and a web browser-based user interface (UI) to be displayed on a web browser corresponding to a service;

displaying, on the web browser, the web browser-based UI corresponding to the service while the installation file of the application that provides the service is being downloaded;

receiving user data which is input in association with the service through the web browser-based UI on the web browser while the installation file of the application that provides the service is being downloaded;

installing the application corresponding to the service on the device, based on completion of downloading the installation file of the application; and executing the installed application and providing the user data through the installed application, wherein the user data is server log information associated with the service, and the method further comprises:

retrieving the server log information received through the web browser-based UI from the server;

using the server log information to continuously receive the service through the executed application after the web browser displaying the web browser-based UI is closed;

ending display of the web browser-based UI and applying the server log information, which has been stored at the end of the display of the web browser-based UI, to the service to be received through the executed application; and synchronizing service data received through the web browser-based UI up to an end time with service data to be received through the executed application.

* * * * *